(12) United States Patent
Zentz et al.

(10) Patent No.: US 12,443,502 B2
(45) Date of Patent: Oct. 14, 2025

(54) AUTOMATED DETERMINATION OF PERFORMANCE IMPACTS RESPONSIVE TO SYSTEM RECONFIGURATION

(71) Applicant: Dell Products L.P., Round Rock, TX (US)

(72) Inventors: Dustin H. Zentz, Shrewsbury, MA (US); Dan Aharoni, Brookline, MA (US); Igal Moshkovich, Even Yehuda (IL)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 18/502,392

(22) Filed: Nov. 6, 2023

(65) Prior Publication Data
US 2025/0147856 A1 May 8, 2025

(51) Int. Cl.
| | | |
|---|---|---|
| *G06F 11/00* | (2006.01) | |
| *G06F 11/30* | (2006.01) | |
| *G06F 11/34* | (2006.01) | |

(52) U.S. Cl.
CPC ...... *G06F 11/3034* (2013.01); *G06F 11/3075* (2013.01); *G06F 11/3409* (2013.01)

(58) Field of Classification Search
CPC ............. G06F 11/3034; G06F 11/3075; G06F 11/3409
See application file for complete search history.

(56) References Cited

U.S. PATENT DOCUMENTS

| | | | |
|---|---|---|---|
| 6,647,458 B1 * | 11/2003 | Glynn ................. | G06F 11/3452 714/719 |
| 7,640,342 B1 * | 12/2009 | Aharoni .............. | G06F 11/3442 709/229 |
| 8,838,931 B1 * | 9/2014 | Marshak .............. | G06F 3/0605 711/170 |
| 9,354,813 B1 * | 5/2016 | Dolan .................. | G06F 3/0647 |
| 9,773,026 B1 * | 9/2017 | Tetreault ............. | G06F 11/3034 |
| 10,579,301 B1 | 3/2020 | Aharoni et al. | |

(Continued)

OTHER PUBLICATIONS

Dell EMC, "Dell EMC VxFlex OS: Networking Best Practices and Design Considerations," Dell EMC White Paper, Jul. 2018, 38 pages.

(Continued)

*Primary Examiner* — Elmira Mehrmanesh
(74) *Attorney, Agent, or Firm* — Ryan, Mason & Lewis, LLP

(57) ABSTRACT

A method in an illustrative embodiment comprises collecting performance measurement data for processing of input-output operations sent by a host to a storage system for a first period of time prior to a configuration change and a second period of time subsequent to the configuration change, processing performance measurement data for the first period of time to determine a first point in a plane defined by a first performance metric and a second performance metric, processing performance measurement data for the second period of time to determine a second point in the plane defined by the first and second performance metrics, determining one or more characteristics of a positioning of the second point relative to the first point, and controlling execution of at least one automated action relating to at least one of the host and the storage system based at least in part on the one or more characteristics.

20 Claims, 15 Drawing Sheets

(56) References Cited

U.S. PATENT DOCUMENTS

| | | | | |
|---|---|---|---|---|
| 2008/0162082 | A1* | 7/2008 | Frazier | G06F 11/3452 |
| | | | | 702/186 |
| 2010/0332923 | A1* | 12/2010 | D'Abreu | G06F 11/1068 |
| | | | | 714/752 |
| 2018/0314774 | A1* | 11/2018 | Khosrowpour | G06F 11/302 |
| 2019/0334770 | A1* | 10/2019 | Xiang | H04L 41/5025 |
| 2021/0004357 | A1* | 1/2021 | Bagchi | G06F 16/217 |
| 2022/0374702 | A1* | 11/2022 | Kushmerick | G06N 3/0464 |

OTHER PUBLICATIONS

EMC Corporation, "EMC ScaleIO Design Considerations and Best Practices," EMC White Paper, Jun. 2016, 30 pages.
NVM Express, "NVM Express Base Specification, Revision 2.0c," NVM Express, Oct. 4, 2022, 458 pages.
Dell Technologies, "Dell PowerFlex," Spec Sheet, Aug. 2023, 14 pages.

* cited by examiner

```
def passed_regression(x1, y1, x2, y2, tol=.1, V=0.051):
    # handle x2-x1=0, y2-y1=0 (the change is close to zero)
    delta_x = abs(x2-x1)/x1
    delta_y = (y2-y1)/y1 if delta_y <= V and delta_x <= V: return True dy/dx
    slope = (y2 - y1) / (x2 - x1)

# handle each quadrant
    if x2 >= x1:   # IOPS increased
        if y2 > y1:   # RT increased (quadrant I)
            if slope <= 1 + tol:
                return True   # RT increased linearly w/ IOPS
            else:
                return False  # RT increased disproportionally to IOPS
        if y2 <= y1:  # RT decreased (quadrant II)
            return True
    elif y2 <= y1:  # IOPS decreased, RT decreased (quadrant III)
        if slope >= 1 - tol:
            return True
        else:
            return False
    else:
        return False  # IOPS decreased and RT increased (quadrant IV)
```

FIG. 5

AUTOMATED DETERMINATION OF PERFORMANCE IMPACTS RESPONSIVE TO SYSTEM RECONFIGURATION

FIELD

The field relates generally to information processing systems, and more particularly to storage in information processing systems.

BACKGROUND

Information processing systems often include distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. For applications running on a host that utilizes the software-defined storage system, such a storage system provides a logical storage volume view to allow a given application to store and access data, without the application being aware that the data is being dynamically distributed among different storage nodes.

In these and numerous other storage system arrangements, it can be difficult to determine whether input-output (IO) performance has improved or degraded after a code upgrade or other type of reconfiguration of at least a portion of the storage system. Similar issues can arise with regard to code upgrades or other reconfigurations of hosts that access the storage system. Accordingly, techniques are needed that can facilitate the determination of performance impacts in conjunction with such reconfigurations.

SUMMARY

Illustrative embodiments provide techniques for automated determination of performance impacts responsive to system reconfigurations, such as code upgrades or other reconfigurations involving at least a portion of one or more hosts and/or a storage system. For example, such techniques can accurately and efficiently determine performance impacts in conjunction with code upgrades and a wide variety of other system reconfigurations. Moreover, some embodiments are advantageously configured to control execution of one or more automated actions, such as one or more additional reconfigurations, based at least in part on one or more results of the automated determination of performance impacts.

In one embodiment, an apparatus comprises at least one processing device that includes a processor coupled to a memory. The at least one processing device is configured, in conjunction with a configuration change of at least one of a host and a storage system, to collect performance measurement data for processing of IO operations sent by the host to the storage system for a first period of time prior to the configuration change and a second period of time subsequent to the configuration change. The at least one processing device is further configured to process at least the performance measurement data for the first period of time to determine a first point in a plane defined by a first performance metric and a second performance metric, to process at least the performance measurement data for the second period of time to determine a second point in the plane defined by the first performance metric and the second performance metric, to determine one or more characteristics of a positioning of the second point relative to the first point, and to control execution of at least one automated action relating to at least one of the host and the storage system based at least in part on the one or more characteristics.

The at least one processing device in some embodiments illustratively comprises at least a portion of the host and/or the storage system. Additionally or alternatively, the at least one processing device may comprise at least a portion of at least one management node coupled to at least one of the host and storage system.

In some embodiments, the first performance metric comprises a response time metric and the second performance metric comprises one of an input-output operations per second (IOPS) metric and a throughput metric. A wide variety of other combinations of two or more performance metrics can be used in other embodiments.

The automated action in some embodiments comprises at least one of (i) generation of an alert providing an indication of acceptable or degraded performance for the configuration change and (ii) initiation of an additional configuration change of at least one of the host and the storage system. Execution of numerous additional or alternative automated actions can be controlled based at least in part on the one or more characteristics.

In another embodiment, a method comprises collecting performance measurement data for processing of input-output operations sent by a host to a storage system for a first period of time prior to a configuration change and a second period of time subsequent to the configuration change, processing at least the performance measurement data for the first period of time to determine a first point in a plane defined by a first performance metric and a second performance metric, processing at least the performance measurement data for the second period of time to determine a second point in the plane defined by the first and second performance metrics, determining one or more characteristics of a positioning of the second point relative to the first point, and controlling execution of at least one automated action relating to at least one of the host and the storage system based at least in part on the one or more characteristics.

As indicated above, illustrative embodiments can accurately and efficiently determine system performance impacts in conjunction with code upgrades and a wide variety of other system reconfigurations, and results of such performance impact determinations can be used to control execution of one or more automated actions, such as, for example, one or more additional reconfigurations. Such additional reconfigurations can be for the same or different portions of the system.

These and other illustrative embodiments include, without limitation, apparatus, systems, methods and processor-readable storage media.

BRIEF DESCRIPTION OF THE DRAWINGS

FIG. 5 shows example software code that implements a portion of functionality for automated determination of performance impacts in an illustrative embodiment.

FIGS. 6A through 6H are collectively referred to herein as FIG. 6.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
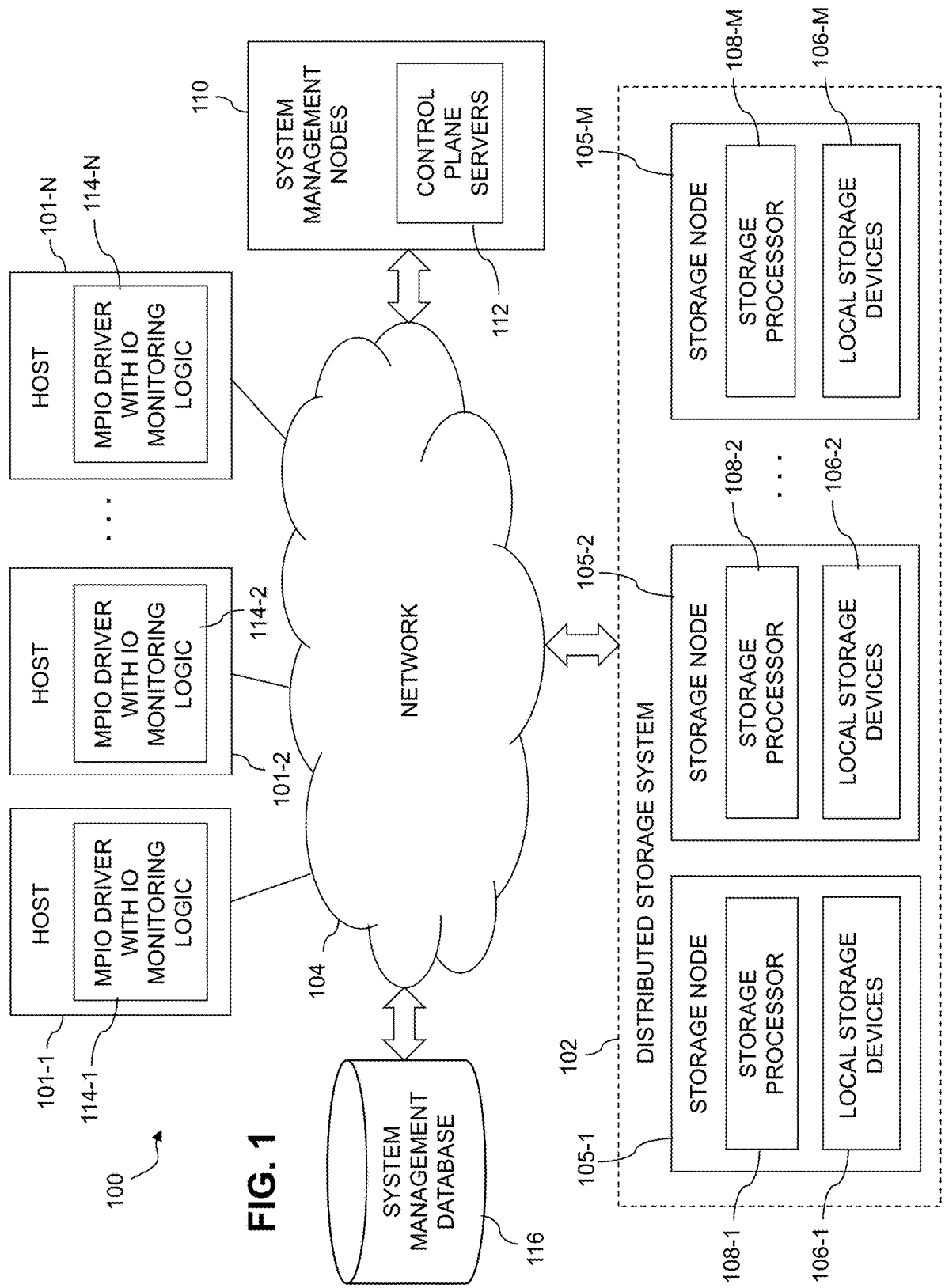
FIG. 1 is a block diagram of an information processing system incorporating functionality for automated determination of performance impacts in an illustrative embodiment.

FIG. 1 shows an information processing system 100 configured in accordance with an illustrative embodiment. The information processing system 100 comprises a plurality of hosts 101-1, 101-2, . . . 101-N, collectively referred to herein as hosts 101, and a distributed storage system 102 shared by the hosts 101. The hosts 101 and distributed storage system 102 in this embodiment are configured to communicate with one another via a network 104 that illustratively utilizes protocols such as Transmission Control Protocol (TCP) and Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

It should be noted that the term "host" as used herein is intended to be broadly construed, so as to encompass, for example, a host device or a host system, each of which may comprise multiple distinct devices of various types. A host in some embodiments can comprise, for example, at least one server, as well as additional or alternative types and arrangements of processing devices.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical identifier (e.g., address) space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments. Examples of such software-defined storage systems will be described in more detail below in conjunction with FIG. 3.

It is to be appreciated, however, that techniques disclosed herein can be implemented in other embodiments in stand-alone storage arrays or other types of storage systems that are not distributed across multiple storage nodes. The disclosed techniques are therefore applicable to a wide variety of different types of storage systems. The distributed storage system 102 is just one illustrative example.

In the distributed storage system 102, each of the storage nodes 105 is illustratively configured to interact with one or more of the hosts 101. The hosts 101 illustratively comprise servers or other types of computers of an enterprise computer system, cloud-based computer system or other arrangement of multiple compute nodes, each associated with one or more system users.

The hosts 101 in some embodiments illustratively provide compute services such as execution of one or more applications on behalf of each of one or more users associated with respective ones of the hosts 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as outstanding IOs that have been admitted by the storage nodes 105 to further processing within the system 100. The storage nodes 105 are illustratively configured to queue IO operations arriving from one or more of the hosts 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms. In the case of separate processing platforms, there may be a single storage node per processing platform or multiple storage nodes per processing platform.

The hosts 101 are illustratively configured to write data to and read data from the distributed storage system 102 comprising storage nodes 105 in accordance with applications executing on those hosts 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) interface cards and/or other types of interfaces of those devices, including, again by way of example, LAN On Motherboard (LOM) network interface cards (NICs) or other types of NICs. Such devices, together with associated host software such as, for example, IO drivers, networking stacks and/or other components, illustratively support networking protocols such as InfiniBand or Fibre Channel, in addition to or in place of TCP/IP. Numerous alternative networking arrangements are possible in a given embodiment, as will be appreciated by those skilled in the art. Additional examples include remote direct memory access (RDMA) over Converged Ethernet (RoCE), illustratively RoCEv2, or RDMA over iWARP.

The first storage node 105-1 comprises a plurality of storage devices 106-1 and an associated storage processor 108-1. The storage devices 106-1 illustratively store metadata and user data associated with one or more storage volumes of the distributed storage system 102. The storage volumes illustratively comprise respective logical units (LUNs) or other types of logical storage volumes (e.g., NVMe namespaces). The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage processor 108-2, and storage node 105-M comprises a plurality of storage devices 106-M and an associated storage processor 108-M.

As indicated previously, the storage devices 106-2 through 106-M illustratively store metadata and user data associated with one or more storage volumes of the distributed storage system 102, such as the above-noted LUNs, NVMe namespaces or other types of logical storage volumes. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node.

The storage processors 108 of the storage nodes 105 may include additional modules and other components typically found in conventional implementations of storage processors and storage systems, although such additional modules and other components are omitted from the figure for clarity and simplicity of illustration.

Additionally or alternatively, the storage processors 108 in some embodiments can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, and spin torque transfer magneto-resistive RAM (STT-MRAM), among numerous other NVM device types known to those skilled in the art. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices of the storage nodes 105 of the distributed storage system of FIG. 1.

In some embodiments, the storage nodes 105 collectively provide a distributed storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the hosts 101 and the storage nodes 105 comprise NVMe commands of an NVMe storage access protocol, for example, as described in the NVM Express Base Specification, Revision 2.0c, October 2022, and its associated NVM Express Command Set Specification and NVM Express TCP Transport Specification, all of which are incorporated by reference herein. Other examples of NVMe storage access protocols that may be utilized in illustrative embodiments disclosed herein include NVMe over Fabrics, also referred to herein as NVMe-oF, and NVMe over TCP, also referred to herein as NVMe/TCP. Other embodiments can utilize other types of storage access protocols. As another example, communications between the hosts 101 and the storage nodes 105 in some embodiments can comprise Small Computer System Interface (SCSI) commands and the Internet SCSI (iSCSI) protocol.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102. Other embodiments can utilize other data protection techniques, such as, for example, Erasure Coding (EC), instead of one or more RAID arrangements.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage processors 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes a plurality of devices, each illustratively a different physical storage device of the storage devices 106. Multiple such physical storage devices are typically utilized to store data of a given LUN, NVMe namespace or other logical storage volume in the distributed storage system. For example, data pages or other data blocks of a given LUN, NVMe namespace or other logical storage volume can be "striped" along with its corresponding parity information across multiple ones of the devices in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the devices to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the devices to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are illustratively interconnected with one another in a full mesh network, or other topology providing full any-to-any network connectivity, and are collectively managed by a system manager. A given set of local persistent storage devices on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as at least one management module or other similar management logic instance, which is assumed to be implemented at least in part on one or more system management nodes 110. Additionally or alternatively, the system manager may be running at least in part on one or more of the storage nodes 105, on another storage node and/or on a separate non-storage node of the distributed storage system. Each such node may be considered an example of a "management node" as that term is broadly used herein.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system management nodes 110 of the system 100 are illustratively configured to provide system management functionality of the type noted above. Such functionality in the present embodiment illustratively further involves utilization of control plane servers 112 and a system management database 116. In some embodiments, at least portions of the system management nodes 110 and their associated control plane servers 112 are distributed over the storage nodes 105. For example, a designated subset of the storage nodes 105 can each be configured to include a corresponding one of the control plane servers 112. Other system management functionality provided by system management nodes 110 can be similarly distributed over a subset of the storage nodes 105.

The system management database 116 stores configuration and operation information of the system 100 and portions thereof are illustratively accessible to various system administrators such as host administrators and storage administrators.

The hosts 101-1, 101-2, . . . 101-N include respective MPIO drivers 114-1, 114-2, . . . 114-N, each of which is assumed to comprise IO monitoring logic as well as path selection logic. The MPIO drivers 114 are illustratively utilized in supporting functionality for automated determination of performance impacts in the system 100, as described in more detail below.

In some embodiments, each of the storage nodes 105 of the distributed storage system 102 is assumed to comprise multiple controllers associated with a corresponding target of that storage node. Such a "target" as that term is broadly used herein is illustratively a destination end of one or more paths from one or more of the hosts 101 to the storage node, and may comprise, for example, an NVM subsystem of the storage node, although other types of targets can be used in other embodiments. It should be noted that different types of targets may be present in NVMe embodiments than are present in other embodiments that use other storage access protocols, such as SCSI embodiments. Accordingly, the types of targets that may be implemented in a given embodiment can vary depending upon the particular storage access protocol being utilized in that embodiment, and/or other factors. Similarly, the types of initiators can vary depending upon the particular storage access protocol, and/or other factors. Again, terms such as "initiator" and "target" as used herein are intended to be broadly construed, and should not be viewed as being limited in any way to particular types of components associated with any particular storage access protocol.

The paths that are selected by instances of path selection logic in the MPIO drivers 114 of the respective hosts 101 for delivering IO operations from the hosts 101 to the distributed storage system 102 are associated with respective initiator-target pairs, as described in more detail elsewhere herein.

In some embodiments, IO operations are processed in the hosts 101 utilizing their respective MPIO drivers 114 in the following manner. A given one of the hosts 101 establishes a plurality of paths between at least one initiator of the given host and a plurality of targets of respective storage nodes 105 of the distributed storage system 102. For each of a plurality of IO operations generated in the given host for delivery to the distributed storage system 102, the host selects a path to a particular target, and sends the IO operation to the corresponding storage node over the selected path.

The given host above is an example of what is more generally referred to herein as "at least one processing device" that includes a processor coupled to a memory. The storage nodes 105 of the distributed storage system 102 are also examples of "at least one processing device" as that term is broadly used herein.

It is to be appreciated that path selection as disclosed herein can be performed independently by each of the hosts 101, illustratively utilizing their respective MPIO drivers 114 and their corresponding IO monitoring logic and path selection logic, as indicated above, with possible involvement of additional or alternative system components.

In some embodiments, the initiator of the given host and the targets of the respective storage nodes 105 are configured to support one or more designated standard storage access protocols, such as an NVMe access protocol or a SCSI access protocol. As more particular examples in the NVMe context, the designated storage access protocol may comprise an NVMe/FC or NVMe/TCP access protocol, although a wide variety of additional or alternative storage access protocols can be used in other embodiments.

The hosts 101 can comprise additional or alternative components. For example, in some embodiments, the hosts 101 further comprise respective sets of IO queues associated with respective ones of the MPIO drivers 114. The MPIO drivers 114 collectively comprise a multi-path layer of the hosts 101. Path selection functionality for delivery of IO operations from the hosts 101 to the distributed storage system 102 is provided in the multi-path layer by respective instances of IO monitoring logic and path selection logic implemented within the corresponding MPIO drivers 114.

The MPIO drivers 114 may comprise, for example, otherwise conventional MPIO drivers, such as PowerPath® drivers from Dell Technologies, suitably modified in the manner disclosed herein to include respective IO monitoring logic and to provide one or more portions of the disclosed functionality for automated determination of performance impacts. Other types of MPIO drivers from other driver vendors may be suitably modified to incorporate one or more portions of the functionality for automated determination of performance impacts as disclosed herein. It should be noted, however, that in other embodiments, the functionality for automated determination of performance impacts can be implemented outside of the MPIO drivers 114 of the hosts 101. For example, the IO monitoring logic can be implemented elsewhere in the hosts 101 or system 100. Accordingly, utilization of MPIO drivers 114 to implement portions of the disclosed functionality for automated determination of performance impacts is an illustrative example only, and other embodiments need not include MPIO drivers 114 or other multi-pathing software.

In some embodiments, the hosts 101 comprise respective local caches, implemented using respective memories of those hosts. A given such local cache can be implemented using one or more cache cards. A wide variety of different caching techniques can be used in other embodiments, as will be appreciated by those skilled in the art. Other examples of memories of the respective hosts 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers 114 are illustratively configured to deliver IO operations selected from their respective sets of IO queues to the distributed storage system 102 via selected ones of multiple paths over the network 104. The sources of the IO operations stored in the sets of IO queues illustratively include respective processes of one or more applications executing on the hosts 101. For example, IO operations can be generated by each of multiple processes of a database application running on one or more of the hosts 101. Such processes issue IO operations for delivery to the distributed storage system 102 over the network 104. Other types of sources of IO operations may be present in a given implementation of system 100.

A given IO operation is therefore illustratively generated by a process of an application running on a given one of the hosts 101, and is queued in one of the IO queues of the given host with other operations generated by other processes of that application, and possibly other processes of other applications.

The paths from the given host to the distributed storage system 102 illustratively comprise paths associated with respective initiator-target pairs, with each initiator comprising, for example, a port of a single-port or multi-port host bus adaptor (HBA) or other initiating entity of the given host and each target comprising a port or other targeted entity corresponding to one or more of the storage devices 106 of the distributed storage system 102. As noted above, the storage devices 106 illustratively comprise LUNs, NVMe namespaces or other types of logical storage devices.

In some embodiments, the paths are associated with respective communication links between the given host and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

Accordingly, in some embodiments, multiple virtual initiators are associated with a single HBA of a given one of the hosts 101 but have respective unique identifiers associated therewith.

Additionally or alternatively, different ones of the multiple virtual initiators are illustratively associated with respective different ones of a plurality of virtual machines of the given host that share a single HBA of the given host, or a plurality of logical partitions of the given host that share a single HBA of the given host.

Numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host in delivering IO operations from the IO queues of that host to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. For example, in the case of write requests, such commands are assumed to have various payload sizes associated therewith, and the payload associated with a given command may be referred to as its "command payload." Other arrangements are used for read requests, with the payload moving in the opposite direction.

A command directed by the given host to the distributed storage system 102 is considered an "outstanding" command until such time as its execution is completed in the viewpoint of the given host, at which time it is considered a "completed" command. The commands illustratively comprise respective NVMe commands, although other command formats, such as SCSI command formats, can be used in other embodiments. In the SCSI context, a given such command is illustratively defined by a corresponding command descriptor block (CDB) or similar format construct. The given command can have multiple blocks of payload associated therewith, such as a particular number of 512-byte SCSI logical blocks or other sizes and/or structures of logical blocks. Other command formats, e.g., Submission Queue Entry (SQE), are utilized in the NVMe context.

In illustrative embodiments to be described below, it is assumed without limitation that the initiators of a plurality of initiator-target pairs comprise or are otherwise associated with respective ports of the given host and that the targets of the plurality of initiator-target pairs comprise or are otherwise associated respective ports of the distributed storage system 102, although numerous other initiator-target arrangements are possible, and such terms are therefore intended to be broadly construed herein, and should not be viewed as limited to particular interface types, such as SCSI or NVMe interfaces. Non-limiting examples of host ports and storage array ports are illustrated in conjunction with the embodiment of FIG. 4. The host ports can comprise, for example, ports of single-port HBAs and/or ports of multi-port HBAs, or other types of host ports, including NICs. Again, a wide variety of other types and arrangements of initiators and targets can be used in other embodiments.

Selecting a particular one of multiple available paths for delivery of a selected one of the IO operations from the given host is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume (e.g., an NVMe namespace) to which the particular IO operation is directed.

It should be noted that paths may be added or deleted between the hosts 101 and the distributed storage system 102 in the system 100. For example, the addition of one or more new paths from the given host to the distributed storage system 102 or the deletion of one or more existing paths from the given host to the distributed storage system 102 may result from respective addition or deletion of at least a portion of the storage devices 106 of the distributed storage system 102.

Addition or deletion of paths can also occur as a result of zoning and masking changes or other types of system reconfigurations performed by a storage administrator or other user. Some embodiments are configured to send a predetermined command from the given host to the distributed storage system 102, illustratively utilizing the MPIO driver, to determine if zoning and masking information has been changed. The predetermined command can comprise, for example, in the SCSI context, a log sense command, a mode sense command, a "vendor unique command" or VU command, or combinations of multiple instances of these or other commands, in an otherwise standardized command format. Analogous NVMe commands include Get Log Page and Get Features commands.

In some embodiments, paths are added or deleted in conjunction with, for example, load rebalancing among storage nodes, or under other conditions such as addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs, NVMe namespaces or other logical storage volumes associated with the one or more new paths identified in the path discovery scan. The path discovery scan may comprise, for example, one or more scans that are configured to discover the appearance of any new LUNs or NVMe namespaces that have been added to the distributed storage system 102 as well to discover the disappearance of any existing LUNs or NVMe namespaces that have been deleted from the distributed storage system 102.

The MPIO driver of the given host in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an operating system kernel of the given host.

For each of one or more new paths identified in the path discovery scan, the given host may be configured to execute a host registration operation for that path. The host registration operation for a given new path illustratively provides notification to the distributed storage system 102 that the given host has discovered the new path.

As indicated previously, the storage nodes 105 of the distributed storage system 102 process IO operations from one or more hosts 101 and in processing those IO operations run various storage application processes that generally involve interaction of that storage node with one or more other ones of the storage nodes.

In the FIG. 1 embodiment, the distributed storage system 102 comprises storage processors 108 and corresponding sets of storage devices 106, and may include additional or alternative components, such as sets of local caches.

The storage processors 108 illustratively control the processing of IO operations received in the distributed storage system 102 from the hosts 101. For example, the storage processors 108 illustratively manage the processing of read and write commands directed by the MPIO drivers of the hosts 101 to particular ones of the storage nodes 105. This processing illustratively includes, for example, a given one of the storage processors 108 on a given one of the storage nodes 105 directing read requests and/or write requests received from one or more of the hosts 101 to local storage devices on the given storage node and/or local storage devices on one or more other ones of the storage nodes 105.

The storage processors 108 can be implemented as respective storage controllers, directors or other storage system components configured to control storage system operations relating to processing of IO operations. In some embodiments, each of the storage processors 108 has a different one of the above-noted local caches associated therewith, although numerous alternative arrangements are possible.

The manner in which functionality for automated determination of performance impacts is implemented in system 100 will now be described in more detail.

As indicated previously, in many storage system arrangements, it can be difficult to determine whether IO performance has improved or degraded after a code upgrade or other type of reconfiguration of at least a portion of the storage system. Similar issues can arise with regard to code upgrades or other reconfigurations of one or more hosts that access the storage system over a network.

Illustrative embodiments disclosed herein address and overcome these and other issues of conventional practice by providing techniques for automated determination of performance impacts, possibly implemented at least in part in a multi-path layer of one or more hosts that access a software-defined storage system or other type of storage system.

Such techniques can accurately and efficiently determine system performance impacts in conjunction with code upgrades and a wide variety of other system reconfigurations, where the term "system reconfiguration" as used herein is intended to be broadly construed so as to encompass a code upgrade or other type of configuration change of at least a portion of at least one host and/or a storage system.

Moreover, some embodiments are advantageously configured to automatically control execution of one or more additional reconfiguration actions or other automated actions based at least in part on one or more results of the automated determination of performance impacts, thereby enhancing performance of the system.

Although some embodiments are described herein in the context of implementing automated determination of performance impacts in a software-defined storage system, it is to be appreciated that other embodiments can be implemented in other types of storage systems, including a wide variety of different stand-alone storage arrays.

As mentioned above, each of the storage nodes 105 of the distributed storage system 102 illustratively comprises one or more targets, where each such target is associated with multiple distinct paths from respective HBAs or other initiators of one or more of the hosts 101.

For example, in some embodiments, one or more of the storage nodes 105 each implements at least one target, such as an NVMe target as further described herein, that is configured to include multiple controllers, such as at least a first controller associated with a first storage pool, and a second controller associated with a second storage pool. The first and second storage pools are illustratively storage pools of the distributed storage system 102, and such storage pools may be distributed across multiple ones of the storage nodes 105. Each of the first and second storage pools is assumed to comprise one or more LUNs, NVMe namespaces or other logical storage volumes.

Although first and second controllers are referred to in conjunction with some embodiments herein, it is to be appreciated that more than two controllers can be implemented in a given target in order to support more than two storage pools.

A given one of the storage nodes 105 illustratively processes IO operations received from one or more of the hosts 101, with different ones of the IO operations being directed by the one or more hosts 101 from one or more initiators of the one or more hosts 101 to different ones of a plurality of targets implemented within the storage nodes.

The automated determination of performance impacts in such an embodiment is illustratively implemented in the following manner.

A given one of the hosts 101, illustratively at least in part via IO monitoring logic of its corresponding one of the MPIO drivers 114, and in conjunction with a configuration change of at least one of that host and the distributed storage system 102, collects performance measurement data for processing of IO operations sent by the host to the distributed storage system 102 for a first period of time prior to the configuration change and a second period of time subsequent to the configuration change. The performance measurement data is then processed in the following manner, illustratively at least in part in the IO monitoring logic and/or in one or more of the system management nodes 110.

More particularly, at least the performance measurement data for the first period of time is processed to determine a first point in a plane defined by a first performance metric and a second performance metric, and at least the performance measurement data for the second period of time is processed to determine a second point in the plane defined by the first performance metric and the second performance metric.

In addition, one or more characteristics of a positioning of the second point relative to the first point are determined, and execution of at least one automated action relating to at least one of the host and the storage system is controlled based at least in part on the one or more characteristics.

Such performance impact determination functionality in some embodiments is based at least in part on linear regression involving multiple performance metrics, as will be described in more detail elsewhere herein.

The first performance metric illustratively comprises a response time (RT) metric and the second performance metric illustratively comprises one of an IO operations per second (IOPS) metric and a throughput metric. Numerous other combinations of additional or alternative performance metrics can be used in other embodiments. For example, in some embodiments, a first plane is defined by the RT metric and the IOPS metric and a second plane is defined by the RT metric and the throughput metric. Functionality described herein with reference to a single plane can then be repeated for each of the first and second planes. Again, numerous other arrangements are possible.

The term "configuration change" as used herein is intended to be broadly construed, so as to encompass, for example, a code change or other change in at least a portion of a host and/or a storage system. Also, collection of performance measurement data "in conjunction with" such a configuration change is similarly intended to be broadly construed, so as to encompass, for example, periodic collections, scheduled collections and/or collections triggered by one or more specified conditions.

In some embodiments, at least portions of the host and/or the storage system may be viewed as examples of what are more generally referred to herein as "at least one processing device" comprising a processor coupled to memory. Additionally or alternatively, such an "at least one processing device" as that term is broadly used herein can comprise, again by way of example, at least a portion of at least one of the system management nodes 110. Such a system management node is an example of what is more generally referred to herein as a "management node" and may comprise, for example, at least a portion of a centralized or distributed management entity of the system 100, possibly including one or more management modules, responsible for implementing configuration changes in the system 100, illustratively under control of one or more administrators or other users. A management node illustratively implements at least a portion of a system manager as described elsewhere herein.

In some embodiments, processing at least the performance measurement data for the first and second periods of time comprises computing average values of the respective first and second performance metrics over each of the first and second periods of time, determining maximum values of the respective first and second performance metrics over both of the first and second periods of time, normalizing the average values of the respective first and second performance metrics over each of the first and second periods of time utilizing their corresponding maximum values, and determining the first and second points utilizing the normalized average values of the first and second performance metrics. Other types and arrangements of processing can be used to determine the first and second points in a plane in other embodiments.

In some embodiments, determining one or more characteristics of a positioning of the second point relative to the first point illustratively comprises, for example, utilizing the first point to separate the plane into a plurality of portions, and determining which of the portions includes the second point. The portions illustratively comprise respective quadrants of the plane, although other portions can be used.

Additionally or alternatively, determining one or more characteristics of a positioning of the second point relative to the first point illustratively comprises computing a slope of a line connecting the first point and the second point in the plane.

In some embodiments, the processing further involves, responsive to the second point being in a particular one of the portions (e.g., a first quadrant) in which a normalized average value of the first performance metric has increased from the first period to the second period and a normalized average value of the second performance metric has increased from the first period to the second period, computing a slope of a line connecting the first point and the second point in the plane, generating an indication of acceptable performance responsive to the slope being below a first threshold, and generating an indication of degraded performance responsive to the slope being above a second threshold.

As another example, the processing may involve, responsive to the second point being in a particular one of the portions (e.g., a second quadrant) in which a normalized average value of the first performance metric has decreased from the first period to the second period and a normalized average value of the second performance metric has increased from the first period to the second period, generating an indication of acceptable performance.

As a further example, the processing may involve, responsive to the second point being in a particular one of the portions (e.g., a third quadrant) in which a normalized average value of the first performance metric has decreased from the first period to the second period and a normalized average value of the second performance metric has decreased from the first period to the second period, computing a slope of a line connecting the first point and the second point in the plane, generating an indication of acceptable performance responsive to the slope being above a first threshold, and generating an indication of degraded performance responsive to the slope being below a second threshold.

As yet another example, the processing may involve, responsive to the second point being in a particular one of the portions (e.g., a fourth quadrant) in which a normalized average value of the first performance metric has increased from the first period to the second period and a normalized average value of the second performance metric has decreased from the first period to the second period, generating an indication of degraded performance.

Other types of processing can additionally or alternatively be performed using the collected performance measurement data. For example, determining one or more characteristics of a positioning of the second point relative to the first point in some embodiments may comprise determining a first difference value between normalized average values of the first performance metric for the respective first and second periods of time, determining a second difference value between normalized average values of the second performance metric for the respective first and second periods of time, generating an indication of acceptable performance responsive to both the first and second difference values being below a specified variance, and generating an indication of degraded performance responsive to one of the first and second difference values being below the specified variance and the other of the first and second difference values being above the specified variance.

A wide variety of different types of automated actions may be triggered based at least in part on one or more results of the above-described processing. For example, the automated action may comprise generation of an alert providing an indication of acceptable or degraded performance for the configuration change, and/or initiation of an additional configuration change of at least one of the host and the storage system.

The IO operations sent by the MPIO drivers 114 from the hosts 101 over selected paths to the distributed storage system 102 are monitored by the corresponding IO monitoring logic instances to collect performance measurement data used to perform the above-described processing involving at least first and second performance metrics defining a plane.

It should be noted that the term "path" as used herein is intended to be broadly construed, and should not be viewed as limited to particular path types associated with particular interfaces such as NVMe or SCSI. For example, in some embodiments, a path may be associated with an initiator-target pair, also referred to in some embodiments as an initiator-target nexus or an IT nexus, and/or a particular LUN, NVMe namespace or other logical storage volume, also referred to in some embodiments as an ITL nexus. Paths in some embodiments may comprise, for example, NVMe associations. Other types and arrangements of paths may be used in other embodiments disclosed herein.

As indicated above, the host in some embodiments may be viewed as an example of what is more generally referred to herein as "at least one processing device" comprising a processor and a memory, with the processor coupled to the memory. Other arrangements of one or more processing devices can be configured to implement the disclosed automated determination of performance impacts functionality in other embodiments.

The host illustratively comprises a plurality of initiators and supports one or more paths between each of the initiators and one or more targets on each of the storage nodes.

In some embodiments, the target of a given initiator-target pair providing a path from a host to a given storage node comprises an NVMe controller, although a wide variety of other types of targets can be used in other embodiments. The term "target" as used herein in the context of a distributed storage system or other type of storage system is therefore intended to be broadly construed.

The target in some embodiments more particularly comprises multiple controllers accessible via respective different associations comprising one or more TCP connections between the given host and the given storage node. For example, the target may comprise a plurality of NVMe controllers of an NVM subsystem that is at least partially resident on the given storage node.

Accordingly, in some embodiments, multiple controllers are part of a single physical controller component of the given storage node. For example, first and second controllers may comprise respective NVMe controllers of an NVM subsystem that is at least partially resident on the given storage node. Such components may be viewed as examples of what are more generally referred to herein as a "target" of the given storage node. Other types of targets comprising one or more controllers can be used in other embodiments.

The first and second controllers in some embodiments may be viewed as comprising respective "virtual" controllers associated with the single physical controller component of the given storage node.

Additionally or alternatively, the first and second controllers in some embodiments are accessible via respective first and second different associations comprising one or more TCP connections between a given one of the one or more hosts 101 and the given storage node. In such an arrangement, a host accesses the first controller using the first association, and accesses the second controller using the second association. Other types of communication links can be used in other embodiments.

In some embodiments, the first controller comprises a first set of IO queues and the second controller comprises a second set of IO queues, for use in processing IO operations for their respective storage pools. Other types of queues, such as, for example, Admin queues, can additionally or alternatively be used.

An additional example of an illustrative process for implementing at least some of the above-described automated determination of performance impacts functionality will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

Also, the term "storage volume" as used herein is intended to be broadly construed, and should not be viewed as being limited to any particular format or configuration.

In some embodiments, the storage nodes 105 are implemented using processing modules that are interconnected, for example, in a full mesh network or other topology providing full any-to-any network connectivity, such that a process of one of the processing modules can communicate with processes of any of the other processing modules. Commands issued by the processes can include, for example, remote procedure calls (RPCs) and/or application programming interface (API) invocations directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in a full mesh network or other topology providing full any-to-any network connectivity, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105 and/or on separate nodes such as one or more of the system management nodes 110.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes. The term "management node" is similarly intended to be broadly construed, and may comprise, for example, a portion of a storage node.

Communication links may be established between the various processing modules of the storage nodes using well-known communication protocols such as TCP/IP and RoCEv2. For example, respective sets of IP links used in data transfer and corresponding messaging could be associated with respective different ones of the routing modules.

The particular features described above in conjunction with FIG. 1 should not be construed as limiting in any way, and a wide variety of other system arrangements implementing automated determination of performance impacts as disclosed herein are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated hosts 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the hosts 101 and the storage nodes 105 to reside in different data centers. Numerous other distributed implementations of the storage nodes 105 and their respective associated sets of hosts 101 are possible.

Additional examples of processing platforms utilized to implement storage systems and possibly their associated hosts in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as hosts 101, distributed storage system 102, storage nodes 105, storage devices 106, storage processors 108, system management nodes 110 and MPIO drivers 114 can be used in other embodiments. For example, as mentioned previously, system management functionality of system management nodes 110 can be distributed across a subset of the storage nodes 105, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of performance impact determination functionality as disclosed herein can be implemented in one or more hosts, in a storage system, or partially in a host and partially in a storage system. Accordingly, illustrative embodiments are not limited to arrangements in which performance impact determination functionality is implemented primarily in storage system or primarily in a particular host or set of hosts, and therefore such embodiments encompass various alternative arrangements, such as, for example, an arrangement in which the functionality is distributed over one or more storage systems and one or more associated hosts, each comprising one or more processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for automated determination of performance impacts as disclosed herein. This process may be viewed as an example algorithm implemented at least in part by one or more of the hosts 101 interacting with distributed storage system 102. These and other algorithms for automated determination of performance impacts as disclosed herein can be implemented using other types and arrangements of system components in other embodiments.

Figure 2:
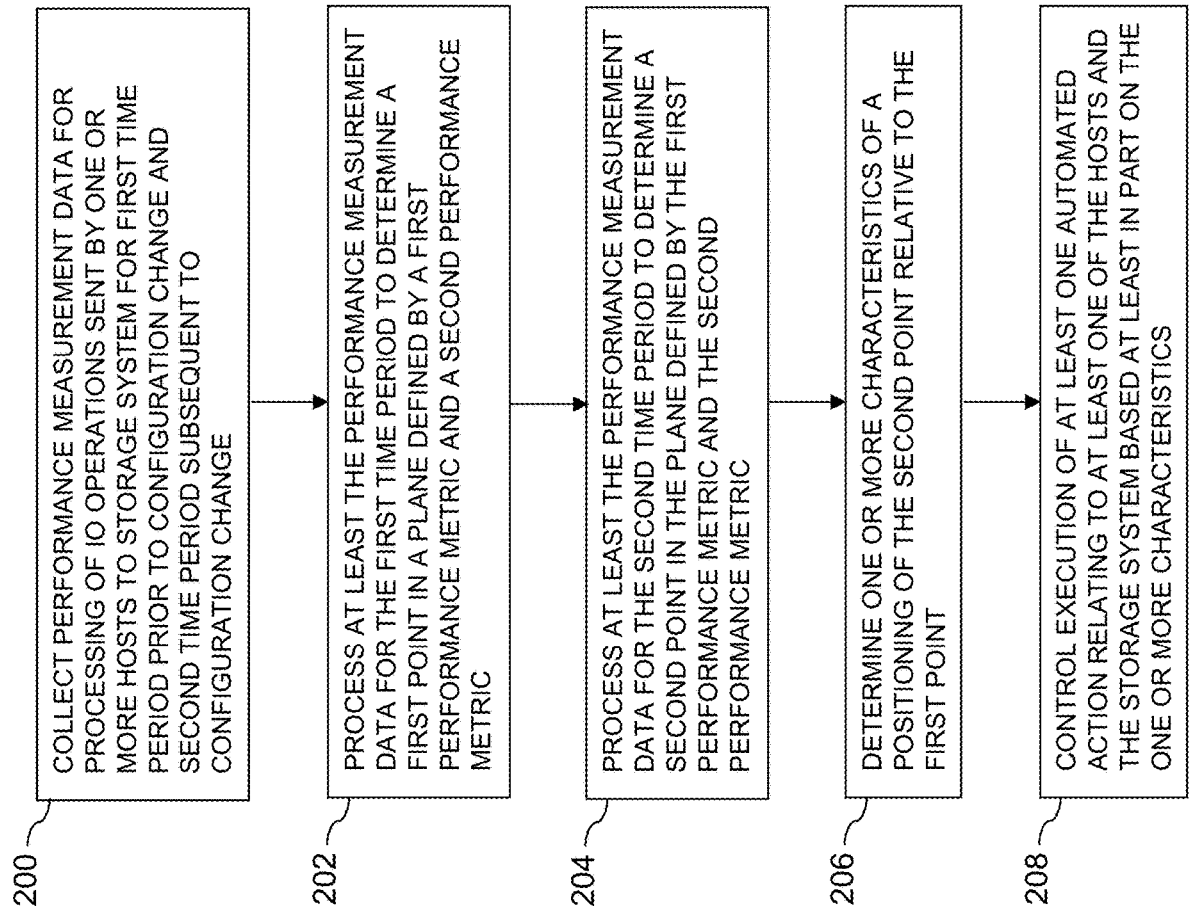
FIG. 2 is a flow diagram of a process for automated determination of performance impacts in an illustrative embodiment.

The process illustrated in FIG. 2 includes steps 200 through 208, and is assumed to be implemented in the system 100 utilizing IO monitoring logic of at least one MPIO driver of at least one host. Such an MPIO driver selects paths for sending IO operations to a storage system and its IO monitoring logic is illustratively configured to collect performance data relating to those IO operations. Similar processes may be implemented primarily by other MPIO drivers of respective other hosts, and may also be implemented at least in part utilizing additional or alternative host drivers or other host components.

It should again be noted that the term "path" as used in this embodiment and other embodiments herein is intended to be broadly construed, and should not be viewed as limited to particular path types associated with particular interfaces such as NVMe or SCSI. For example, a given path can comprise or be otherwise associated with an IT nexus and/or an ITL nexus, or additional or alternative arrangements, and the disclosed embodiments are not limited in this regard.

In step 200, performance measurement data is collected for processing of IO operations sent by one or more hosts to a storage system for first time period prior to configuration change and second time period subsequent to configuration change. The first and second time periods may be substantially equal to one another, although other types and arrangements of time periods and associated performance measurement data collection can be used in other embodiments. The performance measurement data can be collected, for example, by or under the control of IO monitoring logic implemented in one or more MPIO drivers, although numerous other performance monitoring arrangements are possible. A given performance monitor or other implementation of IO monitoring logic can be configured to collect performance measurement data such as RT, IOPS and throughput for IO operations directed to a given set of one or more logical storage volumes. Such performance data can be further processed in the IO monitoring logic and/or provided to another system component, such as one or more system management nodes, for additional processing. For example, in some embodiments, this further processing is based at least in part on linear regression involving multiple performance metrics, as disclosed herein.

In step 202, at least the performance measurement data for the first time period is processed to determine a first point in a plane defined by a first performance metric and a second performance metric. For example, the first performance metric may be an RT metric such as normalized average RT, and the second performance metric may be an IOPS metric such as normalized average IOPS or normalized average throughput. Additional or alternative performance metrics may be used in other embodiments.

In step 204, at least the performance measurement data for the second time period is processed to determine a second point in the plane defined by the first performance metric and the second performance metric.

In step 206, one or more characteristics of a positioning of the second point relative to the first point are determined. This may involve, for example, utilizing the first point to separate the plane into a plurality of portions, and determining which of the portions includes the second point. Additionally or alternatively, determining one or more characteristics of a positioning of the second point relative to the first point may comprise computing a slope of a line connecting the first point and the second point in the plane. In some embodiments, the portions of the plane comprise respective quadrants of the plane, although other arrangements of different portions may be used.

In step 208, execution of at least one automated action relating to at least one of the hosts and the storage system is controlled based at least in part on the one or more characteristics. For example, the automated action may comprise generating an alert providing an indication of acceptable or degraded performance for the configuration change. Such an alert may be provided over a network to a user device of an administrator or other system user, possibly by a system management node. Additionally or alternatively, the automated action may comprise initiation of an additional configuration change of at least one of the host and the storage system. This may involve, for example, reverting a portion of the system that was subject to the configuration change to its previous configuration prior to the change, responsive to an indication of degraded performance. As another example, responsive to an indication of acceptable performance for a particular portion of the system that was subject to the configuration change, the automated action can illustratively include initiating that same configuration change for one or more other portions of the system.

Multiple instances of the above-described process may operate in parallel with one another in order to provide performance impact determination functionality for different sets of logical storage volumes and their corresponding hosts.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations for implementing automated determination of performance impacts for one or more hosts interacting with a storage system. For example, as indicated above, the ordering of the process steps may be varied in other embodiments, or certain steps may be performed at least in part concurrently with one another rather than serially. Also as indicated previously, one or more of the process steps may be repeated periodically, or multiple instances of the process can be performed in parallel with one another in order to implement a plurality of different processes for respective different sets of logical storage volumes and/or hosts.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

One or more hosts and/or one or more storage nodes can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Hosts, storage processors and other system components may be implemented at least in part using processing devices of such processing platforms. For example, respective IO monitoring logic instances, path selection logic instances and other related logic instances of the hosts can be implemented in respective virtual machines running on respective ones of the processing devices of a processing platform.

Additional examples of illustrative embodiments will now be described with reference to FIGS. 3 through 6.

Figure 3:
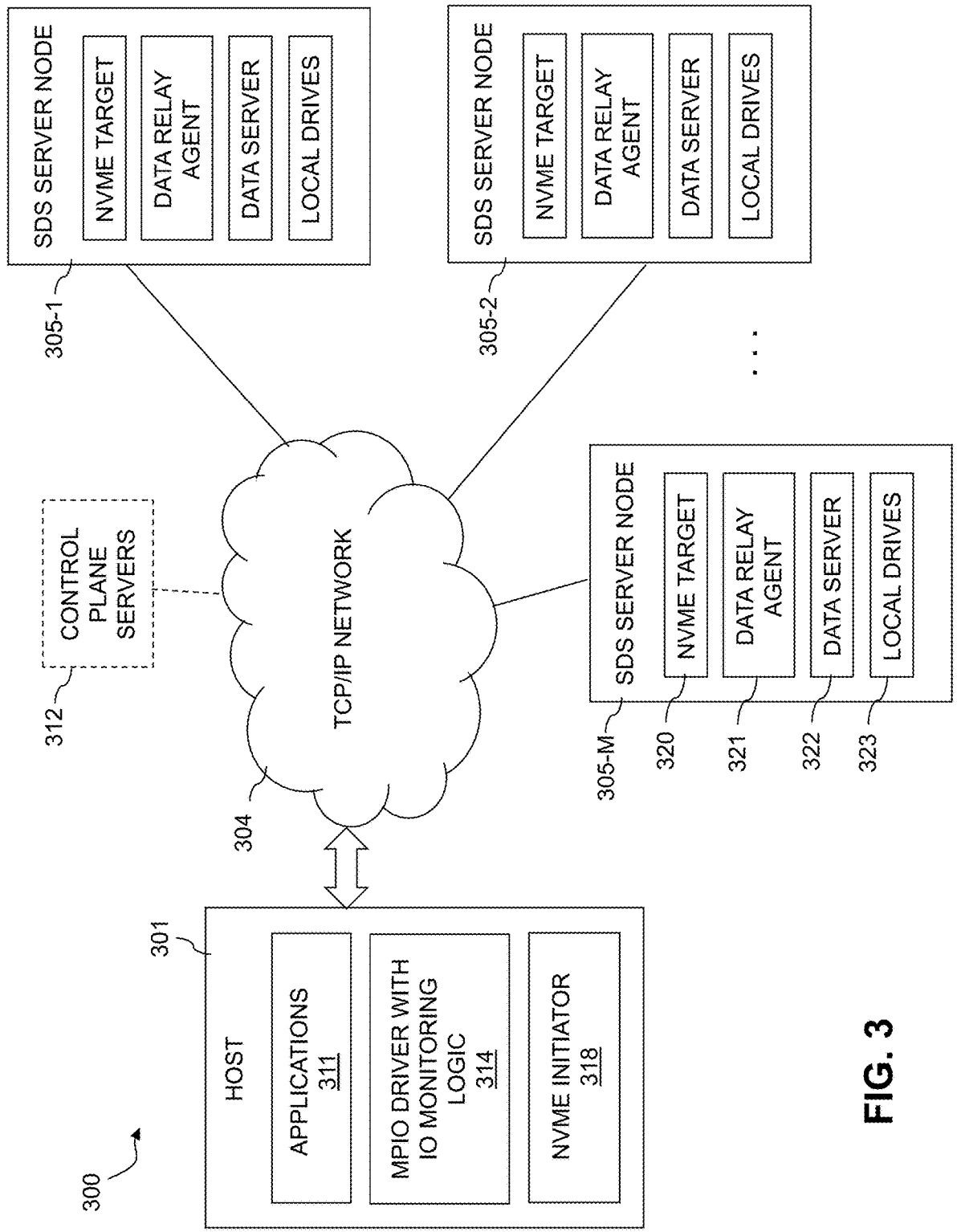
FIG. 3 is a block diagram of another information processing system incorporating functionality for automated determination of performance impacts in an illustrative embodiment.

FIG. 3 illustrates an example of a distributed storage system that more particularly comprises a software-defined storage system having a plurality of software-defined storage server nodes, also referred to as SDS server nodes, configured to utilize an NVMe storage access protocol such as NVMe-oF or NVMe/TCP. Such SDS server nodes are examples of "storage nodes" as that term is broadly used herein. As will be appreciated by those skilled in the art, similar embodiments can be implemented without the use of software-defined storage and with other storage access protocols.

As shown in FIG. 3, an information processing system 300 comprises a host 301 configured to communicate over a network 304, illustratively a TCP/IP network, with a software-defined storage system comprising a plurality of SDS server nodes 305-1, 305-2, ... 305-M and corresponding control plane servers 312. The control plane servers 312 are shown in dashed outline as the functionality of such servers in illustrative embodiments is distributed over a particular subset of the SDS server nodes 305 rather than being implemented on separate nodes of the software-defined storage system. The control plane servers 312 provide system management functionality such as centralized storage provisioning, monitoring, membership management, as well as storage partitioning. Such system management functionality can include at least portions of the processing of performance measurement data described elsewhere herein, to determine performance impacts in conjunction with a configuration change and to control execution of corresponding automated actions.

A plurality of applications 311 execute on the host 301 and generate IO operations that are delivered to particular ones of the SDS server nodes 305 via at least one NVMe initiator 318. The host 301 further comprises an MPIO driver 314 that includes IO monitoring logic illustratively configured to carry out aspects of performance impact determination functionality of the host 301 in a manner similar to that previously described. The IO monitoring logic illustratively implements one or more performance monitors, and possibly additional or alternative components relating to performance impact determination.

For example, the IO monitoring logic is illustratively implemented as a component of the MPIO driver 314 and generates IO performance measurements such as RT, IOPS and throughput as disclosed herein. Those IO performance measurements are further processed in the manner disclosed herein in order to automatically determine performance impacts associated with configuration changes. For example, such automated determination of performance impacts can be performed by one or more of the control plane servers 312, responsive to a particular configuration change for at least a portion of the system 300, and can be used to control whether or not additional configuration changes are made, possibly for other portions of the system 300. The control plane servers 312 can therefore receive the IO performance measurements from the IO monitoring logic of the MPIO driver 314.

Additionally or alternatively, in some embodiments, the IO monitoring logic may be a separate component of the host 301, rather than part of the MPIO driver 314 as illustrated in the embodiment shown in the figure. Also, although only a single host 301 is shown by way of illustrative example in system 300, the system 300 can include multiple hosts, each configured as generally shown for host 301, as in the system 100 of FIG. 1. Other types of system management nodes or other centralized control arrangements, such as an MPIO management station, can be used in other embodiments.

Each of the SDS server nodes 305 in the present embodiment comprises at least one NVMe target 320, a data relay agent 321, a data server 322 and a set of local drives 323. The internal components of a given SDS server node with the exception of the local drives 323 are illustratively part of a corresponding storage processor in the FIG. 1 embodiment, although numerous other arrangements are possible.

It should also be noted that the local drives 323, although illustratively shown by way of example only as being part of their respective corresponding SDS server nodes 305, can instead be implemented in whole or in part externally to the SDS server nodes 305. Such SDS server nodes, and other storage nodes referred to herein, need not physically contain local drives, but can instead be coupled to or otherwise associated with such local drives.

The data relay agent 321 facilitates relaying of IO requests between different ones of the SDS server nodes 305, and the data servers 322 provide access to data stored in the local drives 323 of their respective SDS server nodes 305. Additional or alternative components may be included in the SDS server nodes 305 in illustrative embodiments.

Although single NVMe initiators and targets are shown in respective ones of the host 301 and the SDS server nodes 305, this is by way of simplified illustration only, and other embodiments can include multiple NVMe initiators within host 301 and multiple NVMe targets within each of the SDS server nodes 305.

In some embodiments, the SDS server nodes 305 are configured at least in part as respective PowerFlex® software-defined storage nodes from Dell Technologies, although other types of storage nodes can be used in other embodiments. These and other storage nodes can be modified in some embodiments to implement aspects of the disclosed functionality.

The NVMe targets 320 in some embodiments collectively comprise an NVM subsystem that implements multiple distinct controllers. For example, a given such NVMe target can comprise at least a first controller associated with a first storage pool of the distributed storage system, and a second controller associated with a second storage pool of the distributed storage system. Other types and arrangements of single or multiple controllers can be used, and the term "controller" as used herein is intended to be broadly construed, and should not be viewed as being limited to any particular interface type, such as NVMe or SCSI.

Also, the term "NVMe target" as used herein is intended to be broadly construed, to encompass, for example, any component that is a target of an NVMe command. Moreover, as indicated previously, terms such as "target" and "path" as used herein should not be viewed as being limited to any particular interface type, such as NVMe or SCSI.

A given one of the SDS server nodes 305 processes IO operations received from the host 301, with different ones of the IO operations being directed by the host 301 from NVMe initiator 318 to different ones of the first and second controllers of the NVMe target 320 of the given SDS server node.

In some embodiments, the host 301 communicates with the SDS server nodes 305 via a plurality of TCP associations including at least a first TCP association and a second TCP association, although other communication arrangements can be used. A given such "TCP association" as that term is broadly used herein illustratively comprises one or more TCP connections of an association between a host and a controller. For example, an association between a host and a controller may comprise multiple TCP connections, one for an Admin Queue and one for each of a plurality of IO queues.

The NVMe targets 320 in some embodiments comprise respective NVM subsystems. The NVM subsystem is an example of what is more generally referred to herein as a "target" of the storage system, and each of the SDS server nodes 305 can include multiple such targets, each illustratively implemented as a separate NVM subsystem.

The NVM subsystem in some embodiments comprises at least a first controller and a second controller, with the first and second controllers being associated with respective distinct storage pools of the storage system. In other embodiments, the NVM subsystem can comprise more than two controllers, each associated with one or more storage pools. Accordingly, other embodiments can include only a single storage pool, or can involve different associations between multiple controllers and multiple storage pools. The NVM subsystem in the present embodiment is illustratively a single physical controller component of the storage system, and the first and second controllers may be viewed as comprising respective virtual controllers associated with that single physical controller component, although numerous other arrangements are possible in other embodiments.

The storage system processes IO operations received from the host 301 via the TCP associations. For example, the host 301 illustratively directs IO operations from the NVMe initiator 318 to the first controller via the first TCP association, and directs IO operations from the NVMe initiator to the second controller via the second TCP association. The first and second controllers may comprise respective first and second sets of IO queues. Also the above-noted TCP associations are in the context of NVMe/TCP, the disclosed techniques are more broadly applicable to other contexts, including by way of example other NVMe-OF transport contexts, such as FC and RDMA.

The capacities of the first and second sets of IO queues of the respective first and second controllers may be made different from one another by configuring those first and second sets of IO queues to have at least one of a different number of IO queues and a different IO queue size relative to one another, although in other embodiments the first and second sets of IO queues may have the same capacity.

In some embodiments, the NVMe targets 320, each illustratively comprising one or more NVM subsystems, may be configured as a software-defined target or SDT of the software-defined storage system. Such a target can be implemented at least in part as a Linux user space component, illustratively comprising a daemon listening for incoming TCP connections from one or more NVMe initiators 318 of the host 301. The NVMe target comprising a given NVM subsystem is illustratively accessible from the host 301 via one or more TCP associations, each of which may be associated with a different one of the above-noted first and second controllers of the NVM subsystem.

Figure 4:
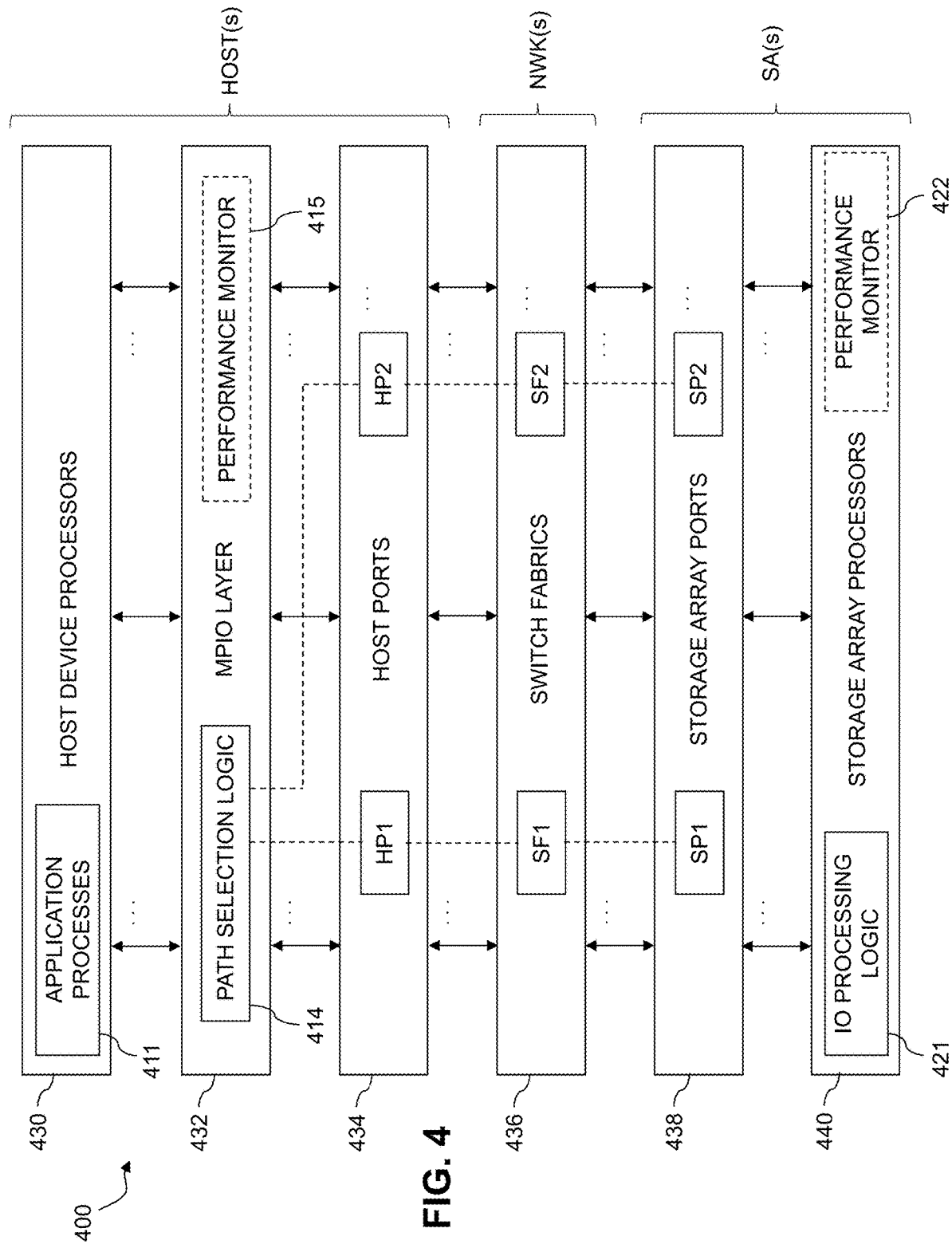
FIG. 4 illustrates a layered system architecture for an information processing system incorporating functionality for automated determination of performance impacts in an illustrative embodiment.

Referring now to FIG. 4, another illustrative embodiment is shown. In this embodiment, an information processing system 400 comprises host-side elements that include application processes 411, path selection logic 414 and performance monitor 415, and storage-side elements that include IO processing logic 421 and performance monitor 422. The path selection logic 414 is configured to operate in conjunction with performance monitor 415, IO processing logic 421 and performance monitor 422 to implement functionality for automated determination of performance impacts in the system 400. There may be separate instances of one or more such elements associated with each of a plurality of system components such as hosts and storage arrays of the system 400. For example, different instances of the path selection logic 414 and performance monitor 415 are illustratively implemented within or otherwise in association with respective ones of a plurality of MPIO drivers of respective hosts.

The system 400 is configured in accordance with a layered system architecture that illustratively includes a host processor layer 430, an MPIO layer 432, a host port layer 434, a switch fabric layer 436, a storage array port layer 438 and a storage array processor layer 440. The host processor layer 430, the MPIO layer 432 and the host port layer 434 are associated with one or more hosts, the switch fabric layer 436 is associated with one or more SANs or other types of networks, and the storage array port layer 438 and storage array processor layer 440 are associated with one or more storage arrays ("SAs"). A given such storage array illustratively comprises a software-defined storage system or other type of distributed storage system comprising a plurality of storage nodes.

The system 400 in this embodiment implements performance impact determination functionality utilizing one or more MPIO drivers of the MPIO layer 432, and associated instances of path selection logic 414 and performance monitor 415, as well as the IO processing logic 421 and performance monitor 422.

The performance monitors 415 and 422 are shown in dashed outline, as a given embodiment may comprise only host-side performance monitor 415, only storage-side performance monitor 422, or both performance monitors 415 and 422, and their respective locations within the system 400 may be varied in other embodiments. For example, one or more of the performance monitors 415 and 422 can be implemented on separate servers or other processing devices that are in communication with the corresponding one or more hosts and/or one or more storage arrays.

Such performance monitors may be viewed as examples of what are more generally referred to herein as IO processing logic instances of the system 400, configured to collect performance measurement information for processing of IO operations sent by the one or more MPIO drivers to the one or more storage arrays.

The application processes 411 generate IO operations that are processed by the MPIO layer 432 for delivery to the one or more storage arrays that collectively comprise a plurality of storage nodes of a distributed storage system. Paths are determined by the path selection logic 414 for sending such IO operations to the one or more storage arrays, and performance in the processing of such IO operations is monitored by the performance monitor 415 and/or the performance monitor 422, using metrics such as RT, IOPS and throughput. The IO operations are sent to the one or more storage arrays in accordance with one or more scheduling algorithms, load balancing algorithms and/or other types of algorithms.

The MPIO layer 432 is an example of what is also referred to herein as a multi-path layer, and comprises one or more MPIO drivers implemented in respective hosts. Each such MPIO driver illustratively comprises respective instances of path selection logic 414 and performance monitor 415 configured as previously described. Additional or alternative layers and logic arrangements can be used in other embodiments.

The IO processing logic 421 implemented in the storage array processor layer 440 processes the IO operations received from the one or more MPIO drivers implemented in respective hosts.

As mentioned above, in the system 400, path selection logic 414 is configured to select different paths for sending IO operations from a given host to a storage array. These paths as illustrated in the figure include a first path from a particular host port denoted HP1 through a particular switch fabric denoted SF1 to a particular storage array port denoted SP1, and a second path from another particular host port denoted HP2 through another particular switch fabric denoted SF2 to another particular storage array port denoted SP2.

These two particular paths are shown by way of illustrative example only, and in many practical implementations there will typically be a much larger number of paths between the one or more hosts and the one or more storage arrays, depending upon the specific system configuration and its deployed numbers of host ports, switch fabrics and storage array ports. For example, each host in the FIG. 4 embodiment can illustratively have the same number and type of paths to a shared storage array, or alternatively different ones of the hosts can have different numbers and types of paths to the storage array.

The path selection logic 414 of the MPIO layer 432 in this embodiment selects paths for delivery of IO operations to the one or more storage arrays having the storage array ports of the storage array port layer 438. More particularly, the path selection logic 414 determines appropriate paths over which to send particular IO operations to particular logical storage devices of the one or more storage arrays.

The performance monitor 415 and/or the performance monitor 422 collect performance measurement data associated with the processing of the IO operations by IO processing logic 421 in the one or more storage arrays. Such performance measurement data is collected for a first period of time prior to a configuration change and for a second period of time subsequent to the configuration change. The collected performance measurement data is processed, illustratively at least in part in the performance monitor 415, the performance monitor 422 and/or elsewhere in the system 400, for the first and second periods of time, to determine respective first and second points in a plane defined by a first performance metric and a second performance metric. The system 400, possibly with involvement of an MPIO management station or other arrangement of one or more external servers or other external processing devices, determines one or more characteristics of a positioning of the second point relative to the first point, and controls execution of at least one automated action relating to at least one of the host and the storage system based at least in part on the one or more characteristics.

Some implementations of the system 400 can include a relatively large number of hosts (e.g., 1000 or more hosts), although as indicated previously different numbers of hosts, and possibly only a single host, may be present in other embodiments. Each of the hosts is typically allocated a sufficient number of host ports to accommodate predicted performance needs. In some cases, the number of ports per host is on the order of 4, 8 or 16, although other numbers of ports could be allocated to each host depending upon the predicted performance needs. A typical storage array may include on the order of 128 ports, although again other numbers can be used based on the particular needs of the implementation. The number of hosts per storage array port in some cases can be on the order of 10 hosts per port.

A given host of system 400 can be configured to initiate an automated path discovery process to discover new paths responsive to updated zoning and masking or other types of storage system reconfigurations performed by a storage administrator or other user. For certain types of hosts, such as hosts using particular operating systems such as Windows, ESX or Linux, automated path discovery via the MPIO drivers of a multi-path layer is typically supported. Other types of hosts using other operating systems such as AIX in some implementations do not necessarily support such automated path discovery, in which case alternative techniques can be used to discover paths.

These and other features of illustrative embodiments disclosed herein are examples only, and should not be construed as limiting in any way. Other types of systems and components can be used in other embodiments, and terms such as "performance impact determination" as used herein are intended to be broadly construed.

Reference will now be made to the additional illustrative embodiments of FIGS. 5 and 6. In these embodiments, it is assumed that IO monitoring logic of a given information processing system, such as system 100, 300 or 400, collects performance measurements over time, including RT, IOPS and throughput (e.g., GB/sec or MB/sec), illustratively for a group of one or more logical storage volumes and at a specified granularity, such as in the form of an average over a particular number of seconds or minutes. Such performance measurements are subject to further processing as described below, with such processing being performed at least in part in the IO monitoring logic and/or in a system management node or other management module of the information processing system.

These illustrative embodiments automatically determine performance impacts associated with configuration changes, such as code changes, and perform one or more automated actions responsive to the determined performance impacts, such as, for example, generating alerts of acceptable or degraded performance and/or controlling execution of one or more additional configuration changes based at least in part on one or more results of the automated determination of performance impacts.

As will be described, these embodiments are based at least in part on linear regression involving multiple performance metrics.

It should be noted that simply monitoring one or more performance metrics, such as RT, may not provide a sufficiently accurate indication of a performance impact. For example, if the RT went up after the configuration change, that might be an indication the performance degraded and if the RT went down after the configuration change, that might be an indication the performance improved. However, if the configuration change opened some bottleneck and the IOPS or throughput increased dramatically, getting a slightly higher RT might be still an indication of improved performance. Similarly, if only IOPS or throughput is monitored, results can be misleading if the RT increased disproportionately.

Moreover, it may not be possible to run more comprehensive IO performance tests on a production storage system to precisely determine the impact of the configuration change, or another workload may affect the results of such comprehensive IO performance tests.

Illustrative embodiments herein allow performance impacts to be determined in an accurate and efficient manner through automated processing of basic IO performance metrics, such as RT and IOPS, or RT and throughput, collected over time.

For simplicity of illustration, in the following description it is assumed that the configuration change comprises a code change, not involving any hardware changes or changes in capacity, and that the application workload is approximately the same before and after the code change. Also, the automated performance impact determination to be made in these examples is illustratively a binary determination as to whether or not the performance improved or degraded after the code change.

It is further assumed that the IO processing logic of each of one or more hosts collects RT, IOPS and throughput measurements over time for sufficiently long periods before and after the configuration change. A wide variety of different techniques can be used to collect such measurements, as will be appreciated by those skilled in the art.

As host workloads tend to change over time (e.g., may be higher on a Monday than on a weekend), some embodiments are configured to eliminate the workload changes over time by averaging the performance measurements over long periods of time, for example, over a week. It is assumed that the duration of the data collection period before the change is similar to that of the data collection period after the change. If a week is not a sufficiently long data collection period, a month or even longer durations could be used.

In these examples, the following performance metrics are collected periodically, for example, approximately every 5 minutes, during the specified data collection period before and after the configuration change:

Weighted $Avg.\ RT\ [usec] =$

"$rt$" $=$ read_percent $*$ read_avg_rt $+$ write_percent $*$ write_avg_rt, where read_percent $+$ write_percent $= 1$ -continued $$\text{Avg. Total IOPS}[1/s] = \text{"iops"} = \text{read\_avg\_iops} + \text{write\_avg\_iops}$$

$$\text{Avg. Total Throughput}[MB/s] =$$
$$\text{"mbps"} = \text{read\_avg\_mbps} + \text{write\_avg\_mbps}$$

The following values are then calculated for the before and after time periods:

$$\text{Avg. } RT = \text{"avg\_rt"} = \text{average}(rt)$$

$$\text{Max. } RT = \text{"max\_rt"} = \max(rt)$$

$$\text{Avg. } IOPS = \text{"avg\_iops"} = \text{average}(iops)$$

$$\text{Max } IOPS = \text{"max\_iops"} = \max(iops)$$

$$\text{Avg. Throughput} = \text{"avg\_mbps"} = \text{average}(mbps)$$

$$\text{Max. Throughput} = \text{"max\_mbps"} = \max(mbps)$$

Also, absolute maximum ("Absolute Max") values are determined, which are the maximum values observed across the before and after datasets:

$$\text{Absolute Max } RT = \text{"abs\_max\_rt"} = \max(\text{max\_rt})$$

$$\text{Absolute Max } IOPS = \text{"abs\_max\_iops"} = \max(\text{max\_iops})$$

$$\text{Absolute Max Throughput} = \text{"abs\_max\_mbps"} = \max(\text{max\_mbps})$$

The absolute maximum values are used to normalize the data in the following manner:

$$\text{Normalized } RT = \text{"norm\_rt"} = \text{avg\_rt}/\text{abs\_max\_rt}$$

$$\text{Normalized } IOPS = \text{norm\_iops"} = \text{avg\_iops}/\text{abs\_max\_iops}$$

$$\text{Normalized Throughput} = \text{"norm\_mbps"} = \text{avg\_mbps}/\text{abs\_max\_mbps}$$

The resulting normalized values are used to determine performance impacts of the configuration change, in the following manner.

Two example criteria are defined below, denoted below as Criterion A and Criterion B. Either or both of these criteria may be used to determine if the performance after the change is improved, unchanged or otherwise acceptable, or if the performance after the change is instead considered degraded. For example, if both criteria are used, both must be met after the change for the performance to be considered acceptable, and if one or more of the criteria are not met, the performance after the change is considered degraded.

Criterion A $$x1 = \text{norm\_iops}(\text{before})$$

$$y1 = \text{norm\_rt}(\text{before})$$

$$x2 = \text{norm\_iops}(\text{after})$$

$$y2 = \text{norm\_rt}(\text{after})$$

$$\text{delta\_x} = \text{abs}(x2-x1)/x1$$

$$\text{delta\_y} = \text{abs}(y2-y1)/y1$$

$V$=variance, $V<1$, where "$V$" is used to handle small changes in the performance that should be ignored The point (x1, y1) is used to divide the plane ([0,1]*[0,1]) into four quadrants, illustratively referred to as Quadrant I, Quadrant II, Quadrant III and Quadrant IV, as follows.

Quadrant I:

$$x2 >= x1 \text{ and } y2 > y1$$

IOPS increased and RT increased
The performance is acceptable only if the RT increased linearly with IOPS Quadrant II:

$$x2 >= x1 \text{ and } y2 <= y1$$

IOPS increased and RT is equal or lesser
If the point (x2,y2) lies in this quadrant, the performance is acceptable Quadrant III:

$$x2 < x1 \text{ and } y2 <= y1$$

IOPS decreased and RT is equal or lesser
The performance is acceptable only if the RT decreased linearly with IOPS Quadrant IV:

$$x2 < x1 \text{ and } y2 > y1$$

IOPS decreased and RT increased
If the point (x2,y2) lies in this quadrant, the performance is degraded In these illustrative embodiments, cases where the change in the performance is very small, close to zero, are initially identified using delta_x, delta_y and V. Performance is considered acceptable in these cases involving very small performance changes, for example, if both delta_x and delta_y are less than or equal to V, and is considered degraded if one of delta_x and delta_y is less than or equal to V and the other of delta_x and delta_y is greater than V. The values delta_x, delta_y are examples of what are more referred to herein as "difference values," and other types of difference values can be used in other embodiments.

Next, in order to evaluate larger changes in performance, the process determines which quadrant contains the point (x2, y2) and checks that (x2, y2) passes the necessary conditions for the performance to be considered acceptable, based on the quadrant.

FIG. 5 shows example software code that implements a portion of the above-described functionality for automated determination of performance impacts in an illustrative embodiment. The example software code in this embodiment is implemented in Python and provides an algorithm for performance impact determination using Criteria A and the above-described processing, where a result of True indicates that performance is acceptable and a result of False indicates that performance is degraded. In this example software code, "tol" denotes a tolerance for the slope evaluations.

The code of FIG. 5 can be adapted in a straightforward manner to implement the disclosed processing for Criterion B, which utilizes normalized average RT and normalized average throughput in MB/sec ("mbps") as follows.

Criterion B $$x1 = \text{norm\_mbps}(\text{before})$$

$$y1 = \text{norm\_rt}(\text{before})$$

$$x2 = \text{norm\_mbps}(\text{after})$$

$y2 = \text{norm\_}rt(\text{after})$ $\text{delta\_}x = \text{abs}(x2-x1)/x1$ $\text{delta\_}y = \text{abs}(y2-y1)/y1$ $V = \text{variance}$, $V<1$, "$V$" is used to handle small changes in the performance that should be ignored The process used to evaluate Criterion B is substantially the same as that described above for Criterion A, except that:

$x1 = \text{norm\_mbps}(\text{before})$ $x2 = \text{norm\_mbps}(\text{after})$

FIGS. 6A through 6H illustrate respective ones of eight possible outcomes of applying the above-described processing to example RT and IOPS performance measurements using Criteria A. These plots are separated into four quadrants, denoted Quadrant I, Quadrant II, Quadrant III and Quadrant IV, in the manner described above. Each plot shows normalized average RT as a function of normalized average IOPS for different reconfiguration scenarios in illustrative embodiments.

Figure 6A:
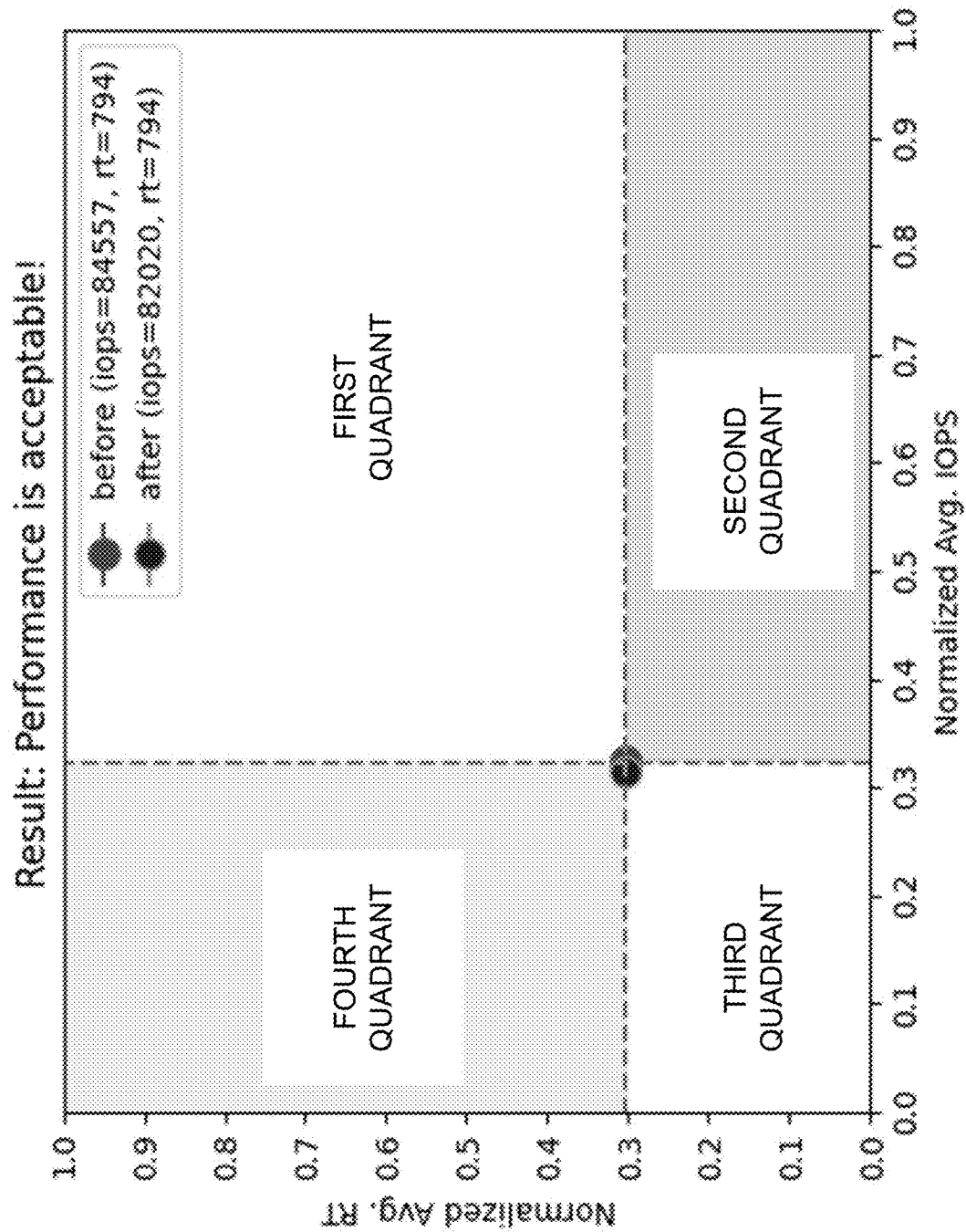
FIGS. 6A through 6H show respective plots of normalized average response time (RT) as a function of normalized average IO operations per second (IOPS) for different reconfiguration scenarios in illustrative embodiments.
Figure 6B:
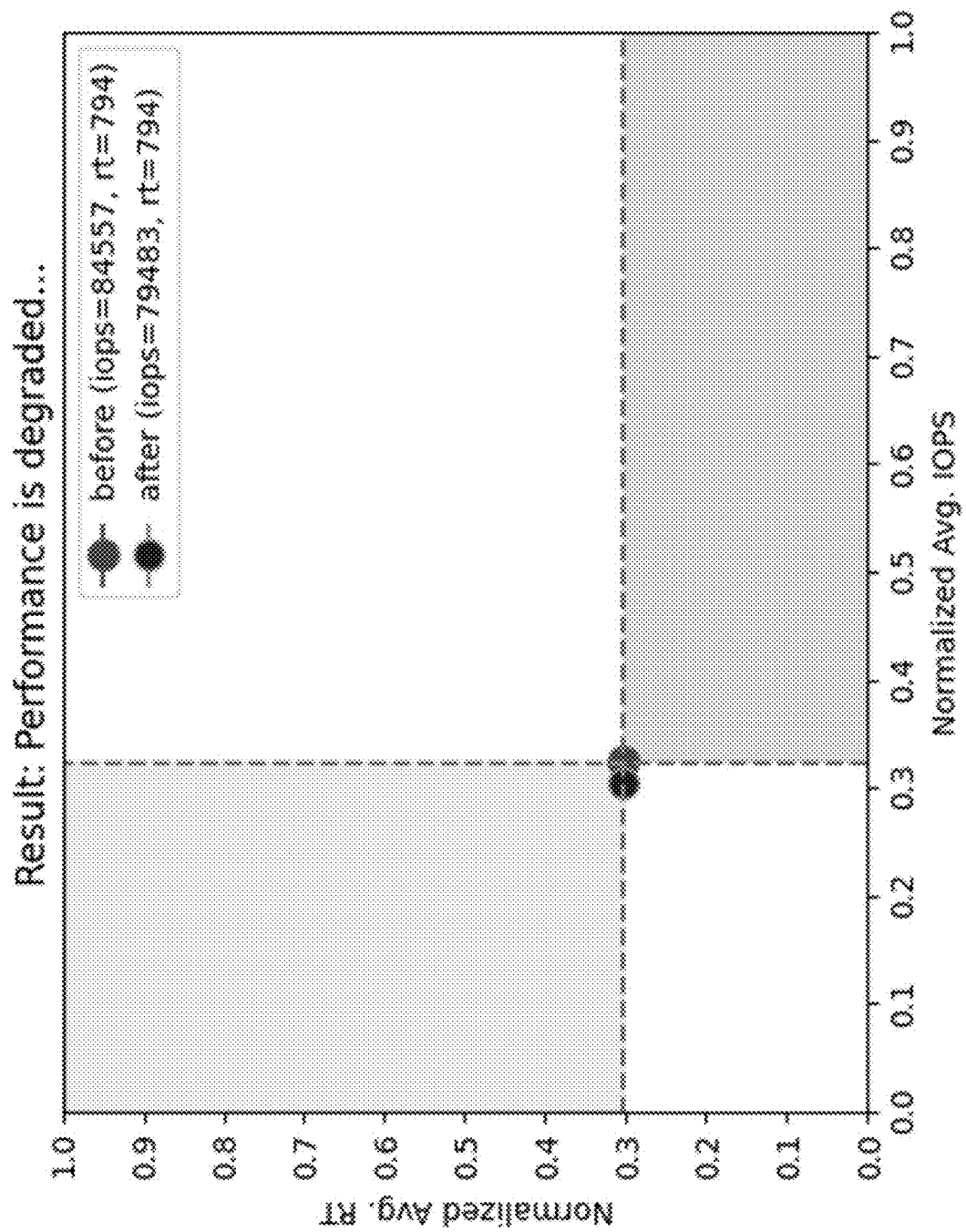

The first two figures, FIGS. 6A and 6B, illustrate examples involving small changes in performance.

FIG. 6A shows a first example of a small change in performance, in which IOPS decreased by 3%, RT is the same, and V=0.05. In this case, the performance is acceptable because the change in each of IOPS and RT is less than the variance V.

FIG. 6B shows another example of a small change in performance, but one in which IOPS decreased by 6%, RT is the same, and V=0.05. In this case, the performance is considered degraded, because although the change in RT is less than the variance V, the change in IOPS is greater than the variance V.

The remaining examples in FIGS. 6C through 6H illustrate how the performance is evaluated for each quadrant.

Figure 6C:
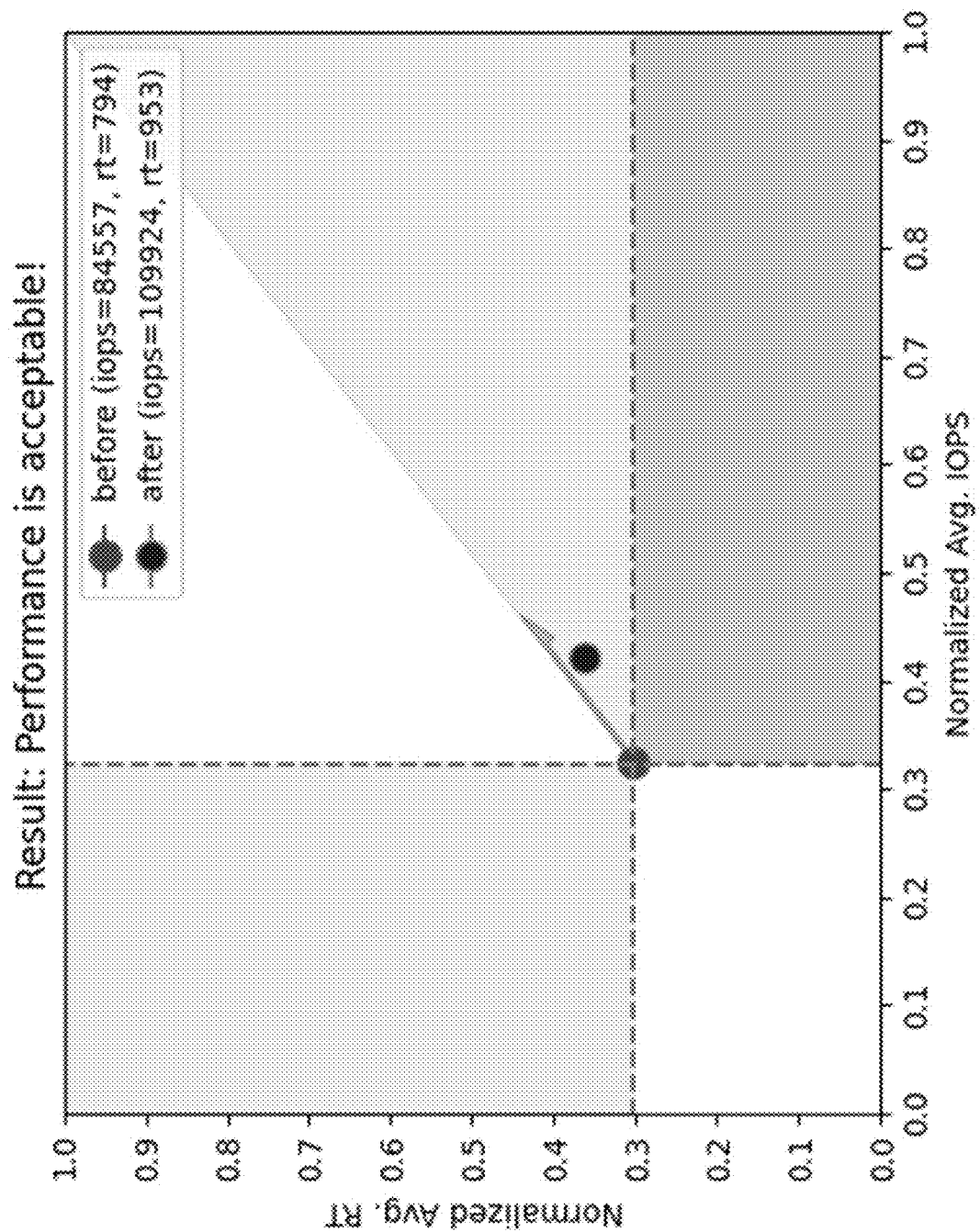

FIG. 6C shows an example in which IOPS increased 30% and RT increased 20%, such that the point (x2, y2) is in Quadrant I. In this case, the performance is acceptable because the RT increased less than the IOPS, such that the slope between the point (x1, y1) and the point (x2, y2) is less than one.

Figure 6D:
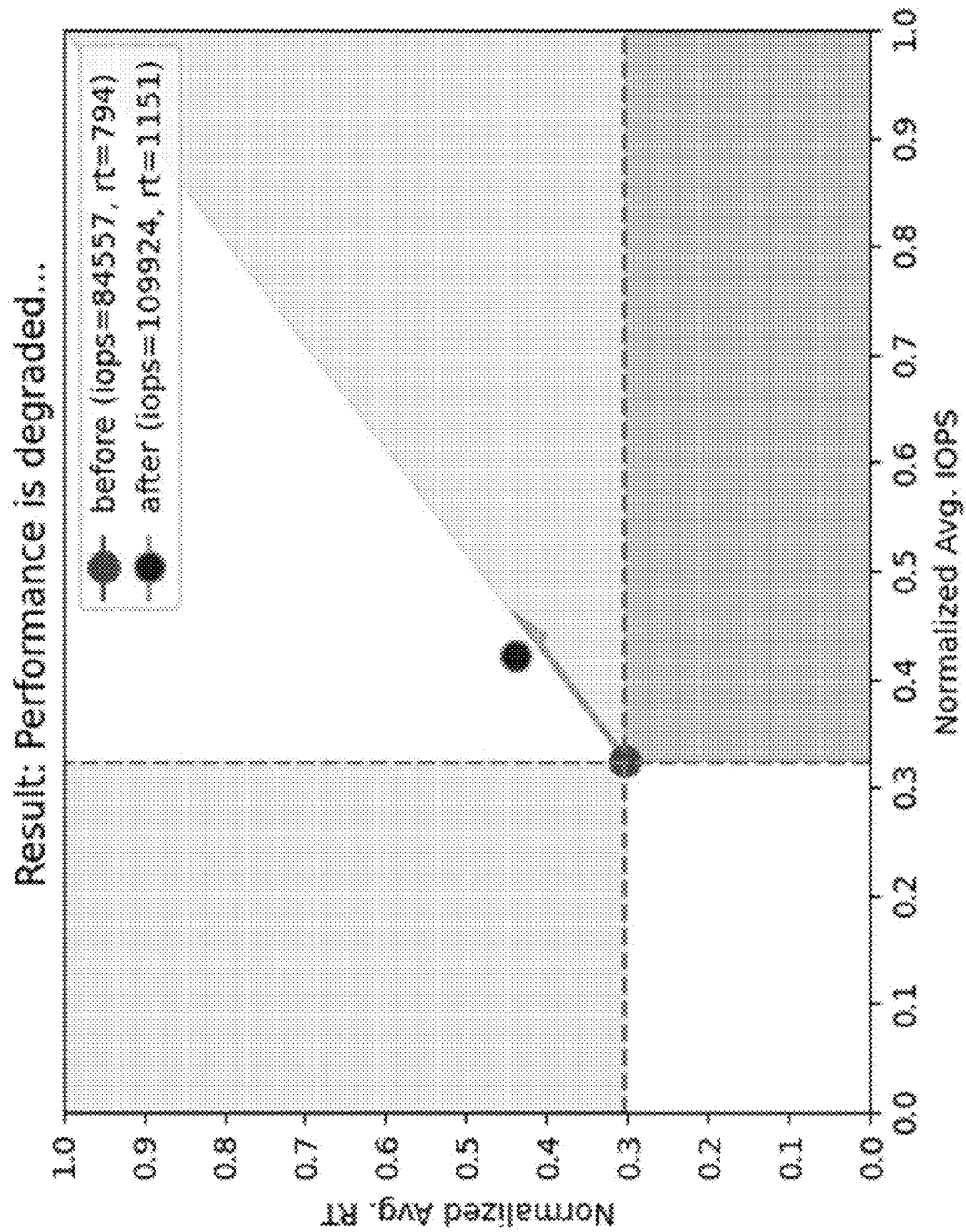

FIG. 6D shows an example in which IOPS increased 30% and RT increased 45%, such that the point (x2, y2) is in Quadrant I. In this case, the performance is degraded because the RT increased at a greater rate than the IOPS, such that the slope between the point (x1, y1) and the point (x2, y2) is greater than one.

Figure 6E:
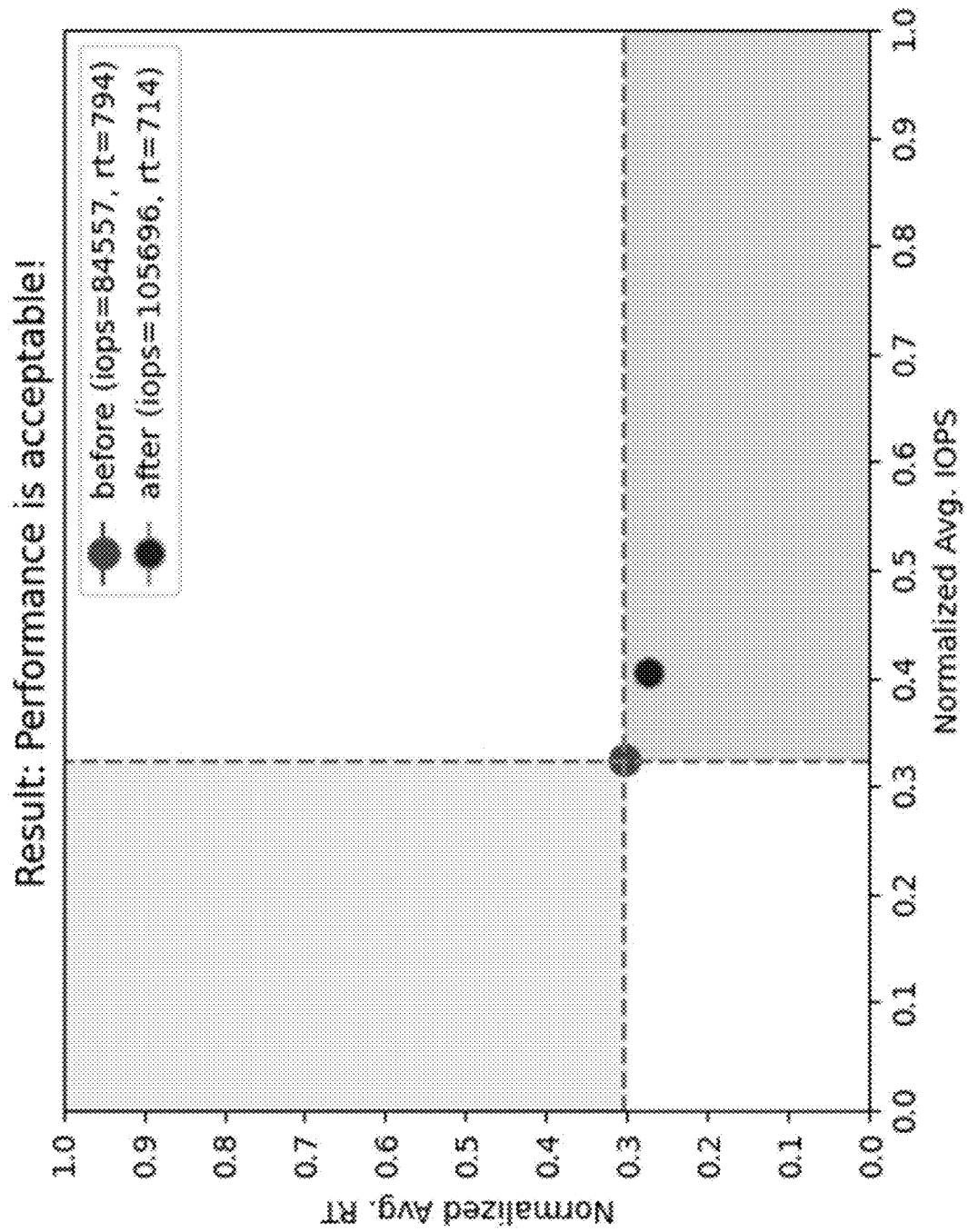

FIG. 6E shows an example in which IOPS increased 25% and RT decreased 10%, such that the point (x2, y2) is in Quadrant II. As IOPS increased and RT decreased, this clearly represents an improvement, and the performance is acceptable.

Figure 6F:
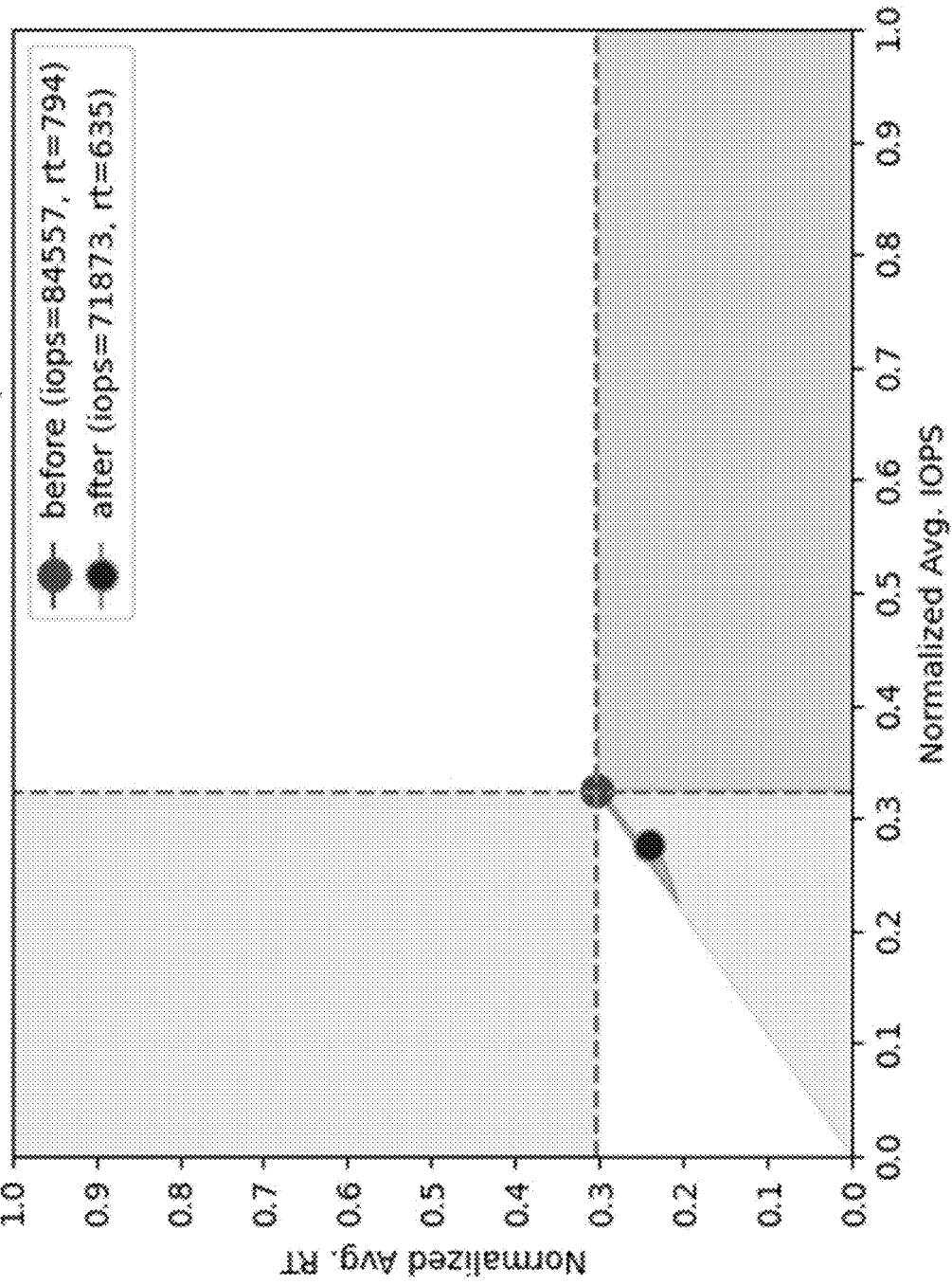

FIG. 6F shows an example in which IOPS decreased 15% and RT decreased 20%, such that the point (x2, y2) is in Quadrant III. In this case, the performance is acceptable because the RT decreased at a greater rate than IOPS, such that the slope between the point (x1, y1) and the point (x2, y2) is greater than one.

Figure 6G:
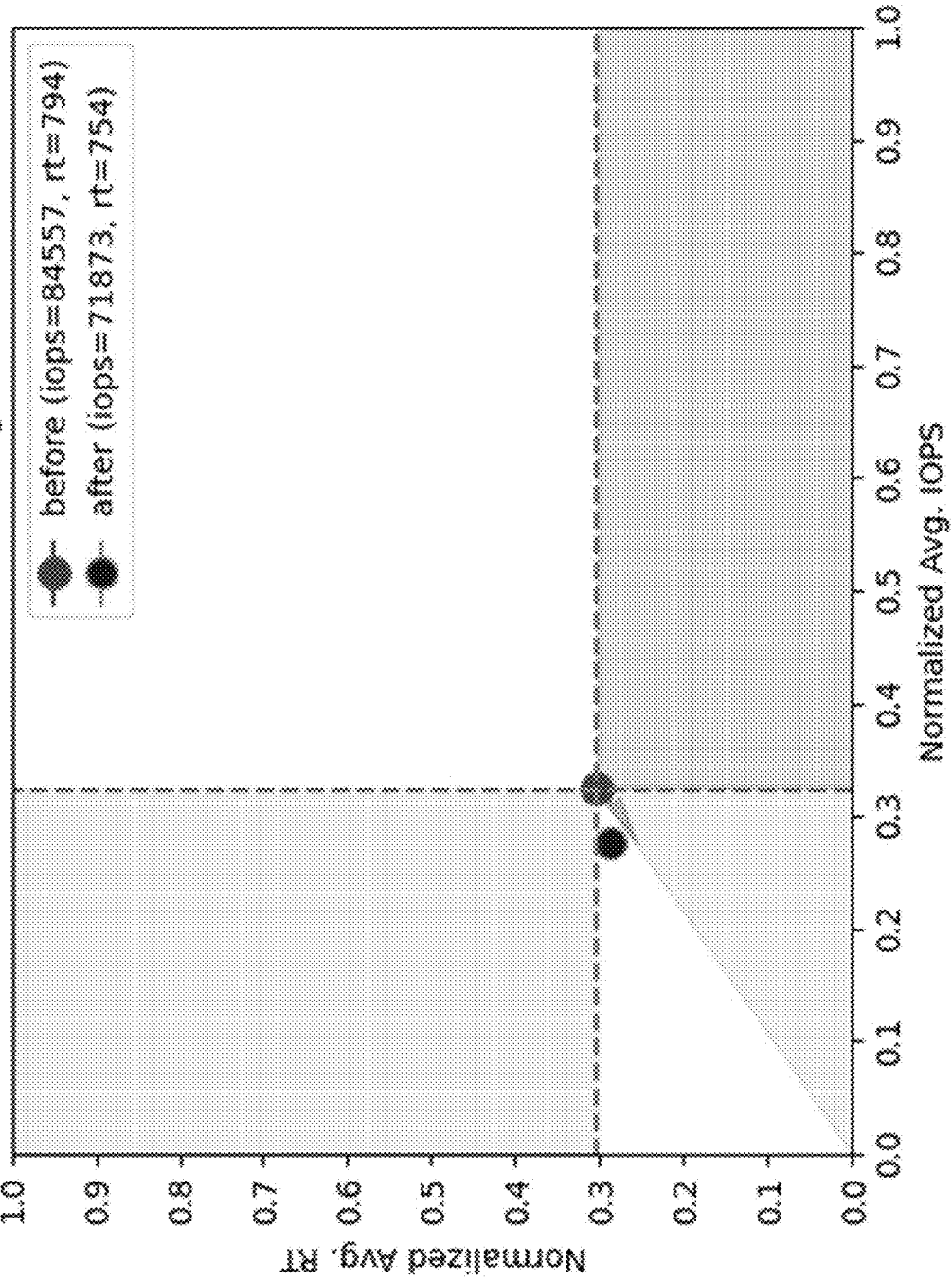

FIG. 6G shows an example in which IOPS decreased 15% and RT decreased 5%, such that the point (x2, y2) is in Quadrant III. In this case, the performance is degraded because IOPS decreased at a greater rate than RT, such that the slope between the point (x1, y1) and the point (x2, y2) is less than one.

Figure 6H:
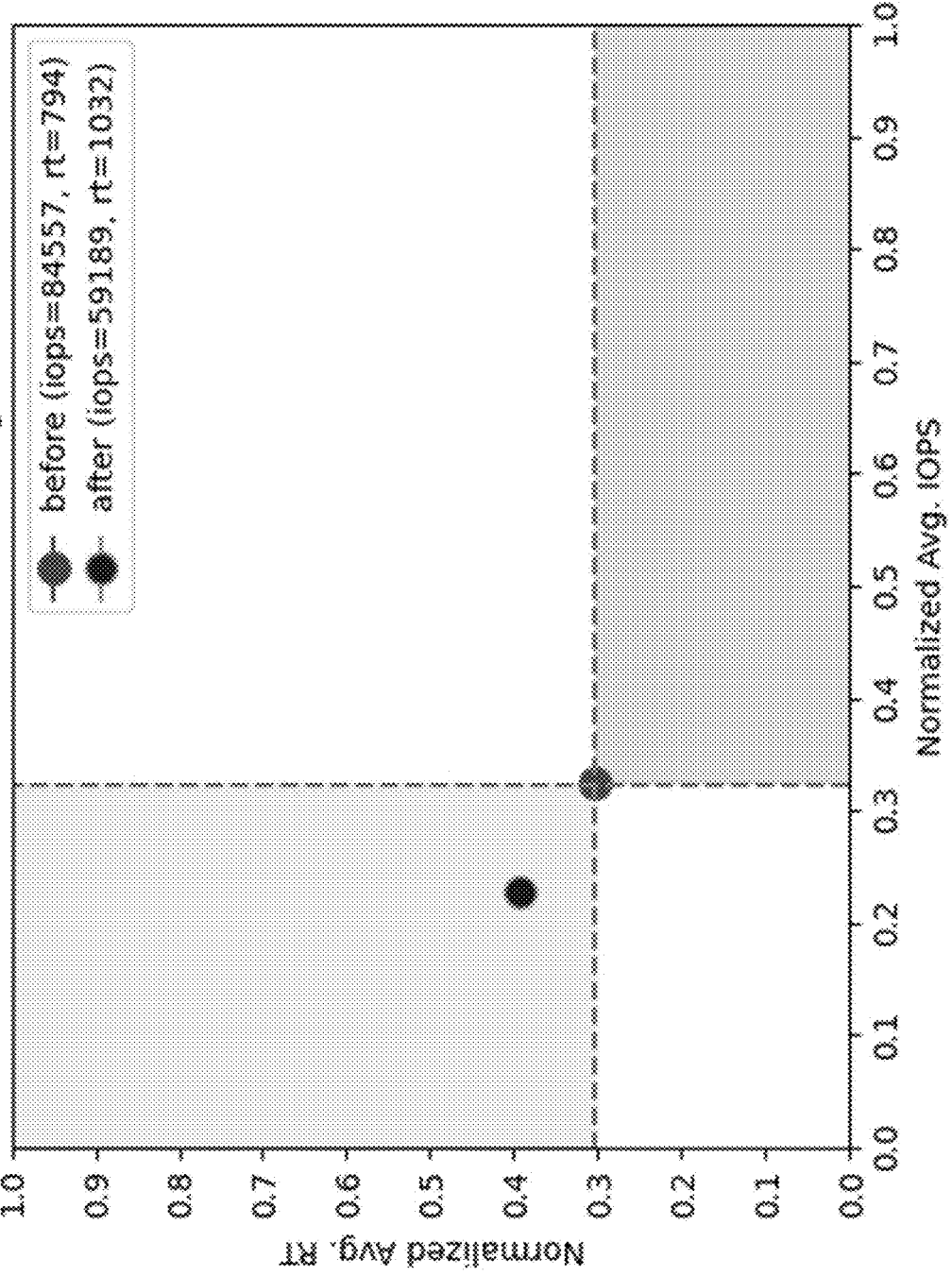

FIG. 6H shows an example in which IOPS decreased 30% and RT increased 30%, such that the point (x2, y2) is in Quadrant IV. In this case, the performance is degraded because IOPS decreased while RT increased, which clearly represents a degradation.

Although the above examples of FIGS. 6A through 6H are illustrated with regard to Criteria A, similar processing is assumed to be implemented for Criteria B. As mentioned previously, one or both of Criteria A and Criteria B can be used in a given embodiment. Additional or alternative criteria can be used in other embodiments.

The above-described illustrative embodiments evaluate a change in performance utilizing processing techniques based at least in part on linear regression involving multiple performance metrics. For example, because RT is dependent on IOPS and throughput, the processing examines the rate of change between these values to determine if the difference is acceptable. This accounts for situations where a code upgrade opened some bottleneck, so the IOPS or throughput increased dramatically and getting a slightly higher RT might be still an indication of improved performance. It also accounts for situations where the workload just decreased. With a different approach, one may believe decreased IOPS is a degradation. By taking the relative change in RT into consideration in the manner disclosed herein, the processing in these embodiments can accurately determine if that is true or not. Similar improvements are provided in numerous other reconfiguration scenarios.

These and other features of illustrative embodiments are presented by way of example only, and can be varied in other embodiments. For example, the disclosed techniques for automated determination of performance impacts can be implemented using additional or alternative components of one or more hosts, configured to interact with additional or alternative components of storage nodes of a storage system.

As indicated above, the above-described illustrative embodiments can provide significant advantages over conventional approaches.

For example, illustrative embodiments disclosed herein provide techniques for automated determination of performance impacts responsive to system reconfigurations, such as code upgrades or other reconfigurations of at least one of a host and a storage system in an information processing system.

These and other embodiments can accurately and efficiently determine system performance impacts in conjunction with code upgrades and a wide variety of other system reconfigurations.

Moreover, some embodiments are advantageously configured to automatically control execution of one or more additional reconfiguration actions or other actions based at least in part on one or more results of the automated determination of performance impacts.

Illustrative embodiments are simple to implement but provide great benefit in terms of enhanced insight into system performance impacts associated with code changes and other types of configuration changes.

These and other embodiments can facilitate achievement of optimal system performance in conjunction with configuration changes. Different sets of baselines can be used for different types of events, such as rebuilding events and rebalancing events. Additionally or alternatively, data collection can be paused at particular times, such as during maintenance events.

Illustrative embodiments disclosed herein can operate with any storage protocol such as those based on NVMe and/or SCSI on any host operating system and with any storage system configuration, including software-defined storage systems and numerous other types and arrangements of distributed storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement hosts and distributed storage systems with performance impact determination functionality will now be described in greater detail with reference to FIGS. 7 and 8. Although described in the context of system 100, these platforms may also be used to implement at least portions of other information processing systems in other embodiments.

Figure 7:
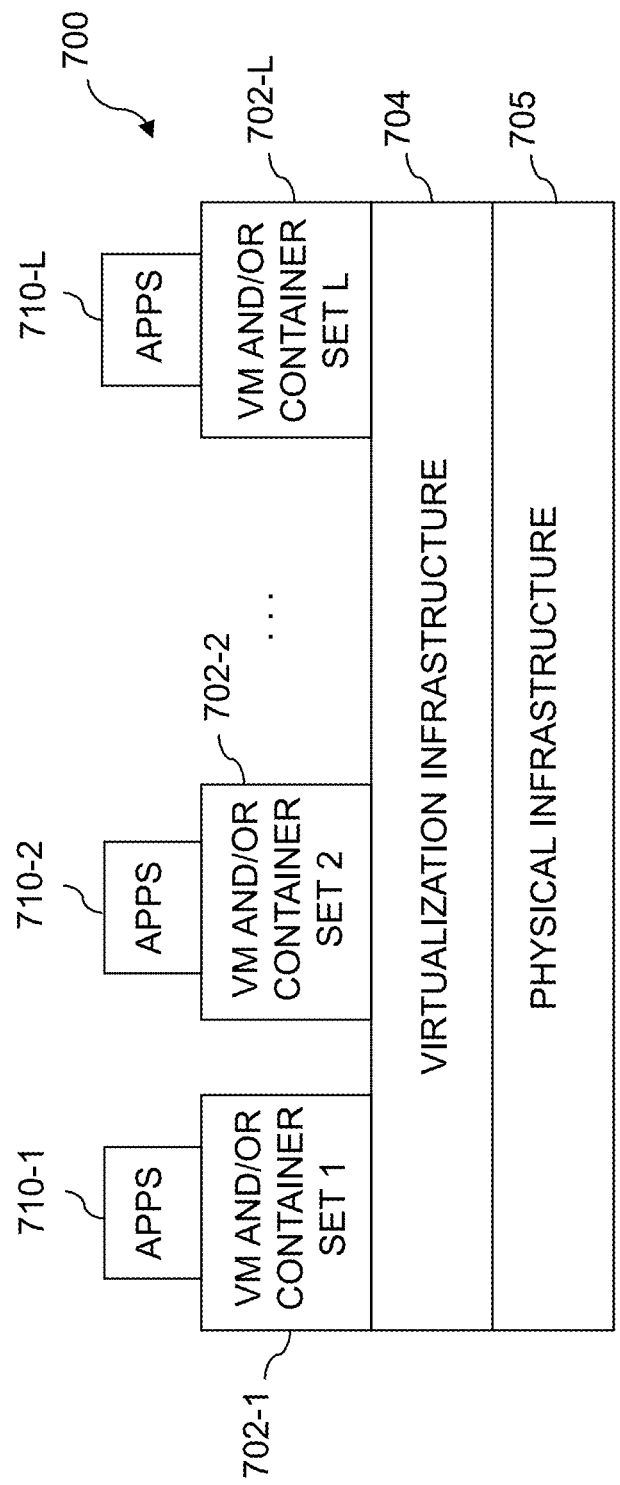
FIGS. 7 and 8 show examples of processing platforms that may be utilized to implement at least a portion of an information processing system in illustrative embodiments.
Figure 8:
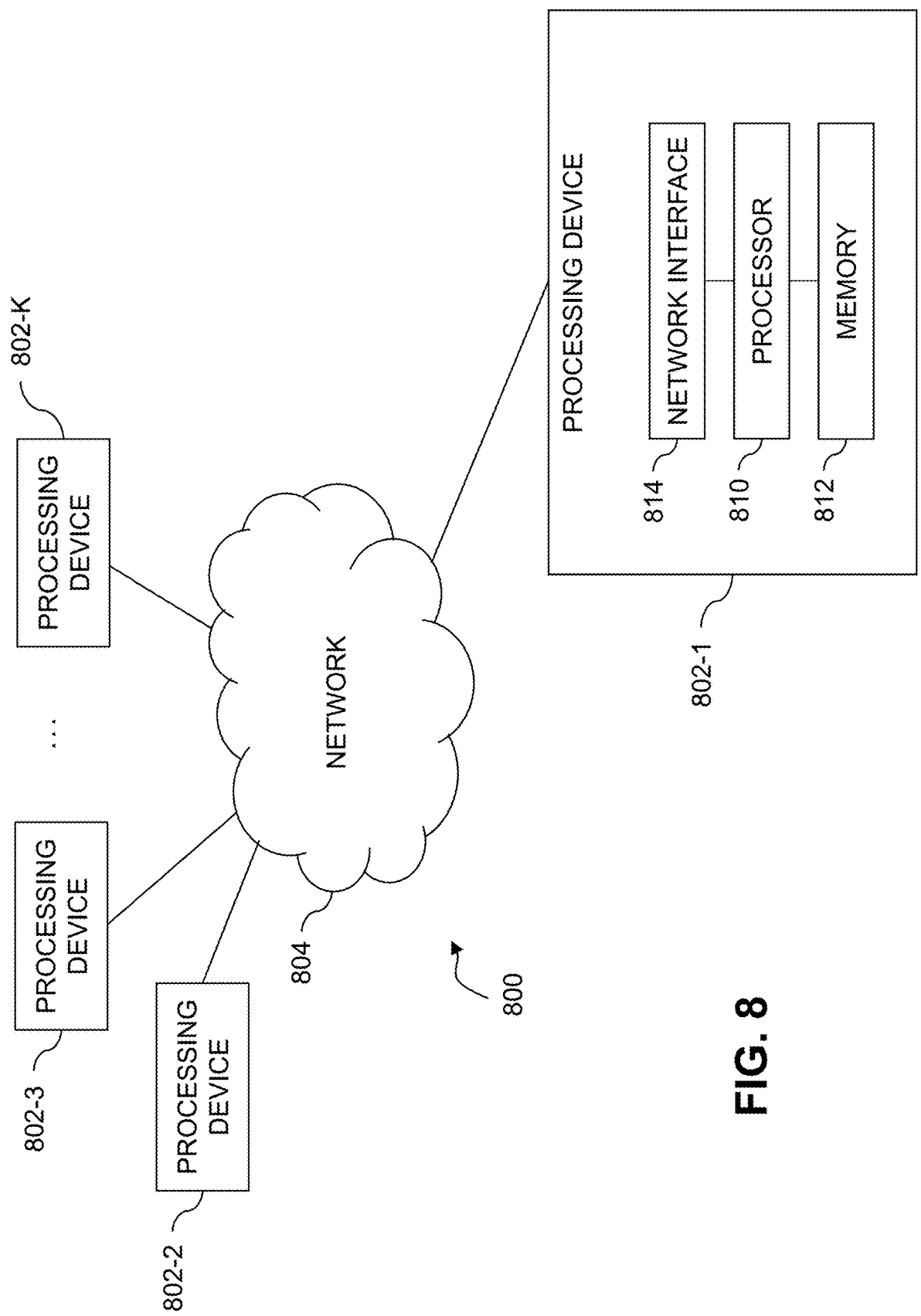

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide performance impact determination functionality in a distributed storage system of the type described above using one or more processes running on a given one of the VMs. For example, each of the VMs can implement logic instances and/or other components for implementing functionality associated with automated determination of performance impacts in the system 100.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide performance impact determination functionality in a distributed storage system of the type described above. For example, a container host supporting multiple containers of one or more container sets can implement logic instances and/or other components for implementing functionality associated with automated determination of performance impacts in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the performance impact determination functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, hosts, storage systems, storage nodes, storage devices, storage processors, initiators, targets, MPIO drivers, multi-path layers, IO monitoring logic and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to generate input-output operations in a host coupled to a storage system over at least one network;
to send the input-output operations from the host to the storage system over the at least one network;
in conjunction with a configuration change of at least one of the host and the storage system, the configuration change comprising a code upgrade of at least one of the host and the storage system from execution of first code to execution of second code different than the first code, to collect performance measurement data, at least in part in at least one multi-path input-output driver of the host, for processing of the input-output operations sent by the host to the storage system for a first period of time prior to the configuration change and a second period of time subsequent to the configuration change;
to process at least the performance measurement data for the first period of time to determine a first point in a plane defined by a first performance metric and a second performance metric;
to process at least the performance measurement data for the second period of time to determine a second point in the plane defined by the first performance metric and the second performance metric;
to determine one or more characteristics of a positioning of the second point relative to the first point, wherein one of the first and second points is utilized to separate the plane into multiple portions, each portion being defined by a particular range of values of the first performance metric and a particular range of values of the second performance metric, and the other of the first and second points determines a positioning of that point within a given one of the portions; and
to control execution of at least one automated action relating to at least one of the host and the storage system based at least in part on the one or more characteristics;
wherein controlling execution of at least one automated action relating to at least one of the host and the storage system comprises automatically reconfiguring at least one of the host and the storage system to execute code other than the second code.

2. The apparatus of claim 1 wherein the at least one processing device comprises at least a portion of at least one of the host and the storage system.

3. The apparatus of claim 1 wherein the at least one processing device comprises at least a portion of at least one management node coupled to at least one of the host and the storage system.

4. The apparatus of claim 1 wherein the first performance metric comprises a response time metric and the second performance metric comprises one of an input-output operations per second (IOPS) metric and a throughput metric.

5. The apparatus of claim 1 wherein processing at least the performance measurement data for the first and second periods of time comprises:
computing average values of the respective first and second performance metrics over each of the first and second periods of time;
determining maximum values of the respective first and second performance metrics over both of the first and second periods of time;
normalizing the average values of the respective first and second performance metrics over each of the first and second periods of time utilizing their corresponding maximum values; and
determining the first and second points utilizing the normalized average values of the first and second performance metrics.

6. The apparatus of claim 1 wherein determining one or more characteristics of a positioning of the second point relative to the first point comprises computing a slope of a line connecting the first point and the second point in the plane.

7. The apparatus of claim 1 wherein determining one or more characteristics of a positioning of the second point relative to the first point comprises:
utilizing the first point to separate the plane into a plurality of portions; and
determining which of the portions includes the second point.

8. The apparatus of claim 7 wherein the portions comprise respective quadrants of the plane.

9. The apparatus of claim 7 wherein responsive to the second point being in a particular one of the portions in which a normalized average value of the first performance metric has increased from the first period to the second period and a normalized average value of the second performance metric has increased from the first period to the second period, computing a slope of a line connecting the first point and the second point in the plane, generating an indication of acceptable performance responsive to the slope being below a first threshold, and generating an indication of degraded performance responsive to the slope being above a second threshold.

10. The apparatus of claim 7 wherein responsive to the second point being in a particular one of the portions in which a normalized average value of the first performance metric has decreased from the first period to the second period and a normalized average value of the second performance metric has increased from the first period to the second period, generating an indication of acceptable performance.

11. The apparatus of claim 7 wherein responsive to the second point being in a particular one of the portions in which a normalized average value of the first performance metric has decreased from the first period to the second period and a normalized average value of the second performance metric has decreased from the first period to the second period, computing a slope of a line connecting the first point and the second point in the plane, generating an indication of acceptable performance responsive to the slope being above a first threshold, and generating an indication of degraded performance responsive to the slope being below a second threshold.

12. The apparatus of claim 7 wherein responsive to the second point being in a particular one of the portions in which a normalized average value of the first performance metric has increased from the first period to the second period and a normalized average value of the second performance metric has decreased from the first period to the second period, generating an indication of degraded performance.

13. The apparatus of claim 1 wherein determining one or more characteristics of a positioning of the second point relative to the first point comprises:
  determining a first difference value between normalized average values of the first performance metric for the respective first and second periods of time;
  determining a second difference value between normalized average values of the second performance metric for the respective first and second periods of time;
  generating an indication of acceptable performance responsive to both the first and second difference values being below a specified variance; and
  generating an indication of degraded performance responsive to one of the first and second difference values being below the specified variance and the other of the first and second difference values being above the specified variance.

14. The apparatus of claim 1 wherein the automated action further comprises generation of an alert providing an indication of acceptable or degraded performance for the configuration change.

15. A computer program product comprising a non-transitory processor-readable storage medium having stored therein program code of one or more software programs, wherein the program code when executed by at least one processing device comprising a processor coupled to a memory, causes the at least one processing device:
  to generate input-output operations in a host coupled to a storage system over at least one network;
  to send the input-output operations from the host to the storage system over the at least one network;
  in conjunction with a configuration change of at least one of the host and the storage system, the configuration change comprising a code upgrade of at least one of the host and the storage system from execution of first code to execution of second code different than the first code, to collect performance measurement data, at least in part in at least one multi-path input-output driver of the host, for processing of the input-output operations sent by the host to the storage system for a first period of time prior to the configuration change and a second period of time subsequent to the configuration change;
  to process at least the performance measurement data for the first period of time to determine a first point in a plane defined by a first performance metric and a second performance metric;
  to process at least the performance measurement data for the second period of time to determine a second point in the plane defined by the first performance metric and the second performance metric;
  to determine one or more characteristics of a positioning of the second point relative to the first point, wherein one of the first and second points is utilized to separate the plane into multiple portions, each portion being defined by a particular range of values of the first performance metric and a particular range of values of the second performance metric, and the other of the first and second points determines a positioning of that point within a given one of the portions; and
  to control execution of at least one automated action relating to at least one of the host and the storage system based at least in part on the one or more characteristics;
  wherein controlling execution of at least one automated action relating to at least one of the host and the storage system comprises automatically reconfiguring at least one of the host and the storage system to execute code other than the second code.

16. The computer program product of claim 15 wherein processing at least the performance measurement data for the first and second periods of time comprises:
  computing average values of the respective first and second performance metrics over each of the first and second periods of time;
  determining maximum values of the respective first and second performance metrics over both of the first and second periods of time;
  normalizing the average values of the respective first and second performance metrics over each of the first and second periods of time utilizing their corresponding maximum values; and
  determining the first and second points utilizing the normalized average values of the first and second performance metrics.

17. The computer program product of claim 15 wherein determining one or more characteristics of a positioning of the second point relative to the first point comprises:
  utilizing the first point to separate the plane into a plurality of portions; and
  determining which of the portions includes the second point.

18. A method comprising:
generating input-output operations in a host coupled to a storage system over at least one network;
sending the input-output operations from the host to the storage system over the at least one network;
in conjunction with a configuration change of at least one of the host and the storage system, the configuration change comprising a code upgrade of at least one of the host and the storage system from execution of first code to execution of second code different than the first code, collecting performance measurement data, at least in part in at least one multi-path input-output driver of the host, for processing of the input-output operations sent by the host to the storage system for a first period of time prior to the configuration change and a second period of time subsequent to the configuration change;

processing at least the performance measurement data for the first period of time to determine a first point in a plane defined by a first performance metric and a second performance metric;

processing at least the performance measurement data for the second period of time to determine a second point in the plane defined by the first performance metric and the second performance metric;

determining one or more characteristics of a positioning of the second point relative to the first point, wherein one of the first and second points is utilized to separate the plane into multiple portions, each portion being defined by a particular range of values of the first performance metric and a particular range of values of the second performance metric, and the other of the first and second points determines a positioning of that point within a given one of the portions; and controlling execution of at least one automated action relating to at least one of the host and the storage system based at least in part on the one or more characteristics;

wherein controlling execution of at least one automated action relating to at least one of the host and the storage system comprises automatically reconfiguring at least one of the host and the storage system to execute code other than the second code; and wherein the method is performed by at least one processing device comprising a processor coupled to a memory.

19. The method of claim 18 wherein processing at least the performance measurement data for the first and second periods of time comprises:

computing average values of the respective first and second performance metrics over each of the first and second periods of time;

determining maximum values of the respective first and second performance metrics over both of the first and second periods of time;

normalizing the average values of the respective first and second performance metrics over each of the first and second periods of time utilizing their corresponding maximum values; and determining the first and second points utilizing the normalized average values of the first and second performance metrics.

20. The method of claim 18 wherein determining one or more characteristics of a positioning of the second point relative to the first point comprises:

utilizing the first point to separate the plane into a plurality of portions; and determining which of the portions includes the second point.

* * * * *